United States Patent
Fitzgerald et al.

(10) Patent No.: US 11,644,951 B2
(45) Date of Patent: May 9, 2023

(54) DYNAMIC DASHBOARD OF USER INTERFACE DISPLAYING PRIMARY OBJECT AND RELATED OBJECTS

(71) Applicant: EMC IP Holding Company LLC, Hopkinton, MA (US)

(72) Inventors: Robert Fitzgerald, Cork (IE); David P. Moloney, Cork (IE); Finbarr O'Riordan, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 16/860,574

(22) Filed: Apr. 28, 2020

(65) Prior Publication Data

US 2021/0333953 A1 Oct. 28, 2021

(51) Int. Cl.
*G06F 3/0482* (2013.01)
*G06F 3/04847* (2022.01)
*G06F 16/248* (2019.01)
*G06F 16/28* (2019.01)

(52) U.S. Cl.
CPC ........ *G06F 3/0482* (2013.01); *G06F 3/04847* (2013.01); *G06F 16/248* (2019.01); *G06F 16/289* (2019.01)

(58) Field of Classification Search
CPC .. G06F 3/0482; G06F 3/04847; G06F 16/248; G06F 16/289; G06F 16/26
See application file for complete search history.

(56) References Cited

U.S. PATENT DOCUMENTS

| 5,544,347 A | 8/1996 | Yanai et al. |
| 5,742,792 A | 4/1998 | Yanai et al. |
| 6,968,369 B2 | 11/2005 | Veprinsky et al. |
| 7,054,883 B2 | 5/2006 | Meiri et al. |
| 8,767,593 B1 * | 7/2014 | Allen ............................ 370/263 |
| 11,275,944 B1 * | 3/2022 | Bhushan ............... G06T 19/006 |
| 2012/0016978 A1 * | 1/2012 | Bosworth ............. G06F 9/5055 709/224 |
| 2021/0191769 A1 * | 6/2021 | Eschinger ........... G06F 11/1464 |

OTHER PUBLICATIONS

Sandeep Chandrashekhara, "Efficient Snapshot Activation," U.S. Appl. No. 15/969,048, filed May 2, 2018.

* cited by examiner

*Primary Examiner* — Cao H Nguyen
(74) *Attorney, Agent, or Firm* — Muirhead and Saturnelli, LLC

(57) ABSTRACT

Techniques for specifying information displayed in a graphical user interface may include: receiving a runbook definition that is a template including a primary object category, a first object category related to the primary object category, a first chart definition of metrics about the primary object category, and a second chart definition of metrics about the first object category; loading the runbook definition; applying the runbook definition to a first primary object that is an instance of the primary object category, wherein the first primary object has a first related object and the first related object is an instance of the first object category; and updating the graphical user interface to display a first chart having the first chart definition for the first primary object and to display a second chart having the second chart definition for the first related object.

23 Claims, 23 Drawing Sheets

DYNAMIC DASHBOARD OF USER INTERFACE DISPLAYING PRIMARY OBJECT AND RELATED OBJECTS

BACKGROUND

Technical Field

This application generally relates to user interfaces (UIs), such as a graphical user interface (GUI).

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for specifying information displayed in a graphical user interface comprising: receiving a runbook definition, wherein the runbook definition is a template including a primary object category, a first object category that is related to the primary object category, a first chart definition of first one or more metrics about the primary object category, and a second chart definition of second one or more metrics about the first object category; loading the runbook definition; applying the runbook definition to a first primary object that is an instance of the primary object category, wherein the first primary object has a first related object and the first related object is an instance of the first object category; and in response to said applying, updating the graphical user interface to display a first chart having the first chart definition of the first one or more metrics for the first primary object and updating the graphical user interface to display a second chart having the second chart definition of the second one or more metrics for the first related object.

In at least one embodiment, processing may include: selecting a second primary object that is an instance of the primary object category; applying the runbook definition to the second primary object that is an instance of the primary object category, wherein the second primary object has a second related object and wherein the second related object is an instance of the first object category; and in response to said applying the runbook definition to the second primary object, updating the graphical user interface to display a third chart having the first chart definition of the first one or more metrics for the second primary object and updating the graphical user interface to display a fourth chart having the second chart definition of the second one or more metrics for the second related object. The runbook definition may be persistently stored in a database.

In at least one embodiment, first processing may be performed that creates the runbook definition. The first processing may include: selecting the primary object category from a plurality of predefined primary object categories; creating the first chart definition of the first one or more metrics about the primary object category; displaying a plurality of predefined related object categories that are related to the selected primary object category, wherein the plurality of predefined related object categories includes the first object category; responsive to displaying the plurality of predefined related object categories, selecting the first object category from the plurality of predefined related object categories; and creating the second chart definition of the second one or more metrics about the first object category.

In at least one embodiment, processing may be performed that generates an updated version of the runbook definition. The processing may include updating the runbook definition to include a third chart definition of third one or more metrics about a specified object category that is one of the primary object category or the first object category, and wherein the updated version of the runbook definition may include the third chart definition.

In at least one embodiment, the updated version of the runbook definition may be stored as a new runbook definition. Processing may include: loading the new runbook definition; applying the new runbook definition to a second primary object that is an instance of the primary object category and wherein the second primary object has a second related object that is an instance of the first object category; and in response to said applying the new runbook definition, performing second processing including: updating the graphical user interface to display a third chart having the first chart definition of the first one or more metrics for the second primary object; updating the graphical user interface to display a fourth chart having the second chart definition of the second one or more metrics for the second related object; and updating the graphical user interface to display a fifth chart having the third chart definition of the third one or more metrics about one of the second primary object or the second related object determined in accordance with the specified object category.

In at least one embodiment, the primary object category and the first object category that is related to the primary object category may define a first relationship between objects, and wherein the first relationship between objects may be included in a plurality of predefined relationships between a plurality of primary object categories and a plurality of other object categories related to the plurality of primary object categories. The plurality of primary object categories and the plurality of other object categories may be storage object categories. Each of the storage object categories may denote a physical storage object category in a data storage system or a logical storage object category in the data storage system. The storage object categories may include any one or more of: a data storage array, a storage group, a logical device, a physical storage device, a front end director, a front end director port, a back end director, and a back end director port. The primary object category may be the storage group and the first primary object may denote a first storage group defined in a current configuration of the data storage system, and wherein the first object category may be the logical device and the first related object may denote a first logical device of the first storage group as defined in the current configuration of the data storage system.

In at least one embodiment, the graphical user interface may be included in a data storage management application. Each of the first chart definition and the second chart definition may identify a chart type. The chart type may be included in a plurality of predefined chart types including a graph and a table. The runbook definition may be a first runbook definition that is linked to a second runbook definition. The processing performed may include: selecting the first related object displayed in the graphical user interface; and responsive to selecting the first related object, performing processing to link to the second runbook definition. The processing may include: loading the second runbook definition; applying the second runbook definition to the first related object as a second primary object used in connection with the second runbook definition; and updating the graphical user interface to include one or more additional charts each having a chart definition included in the second runbook definition.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF
EMBODIMENT(S)

Figure 1:
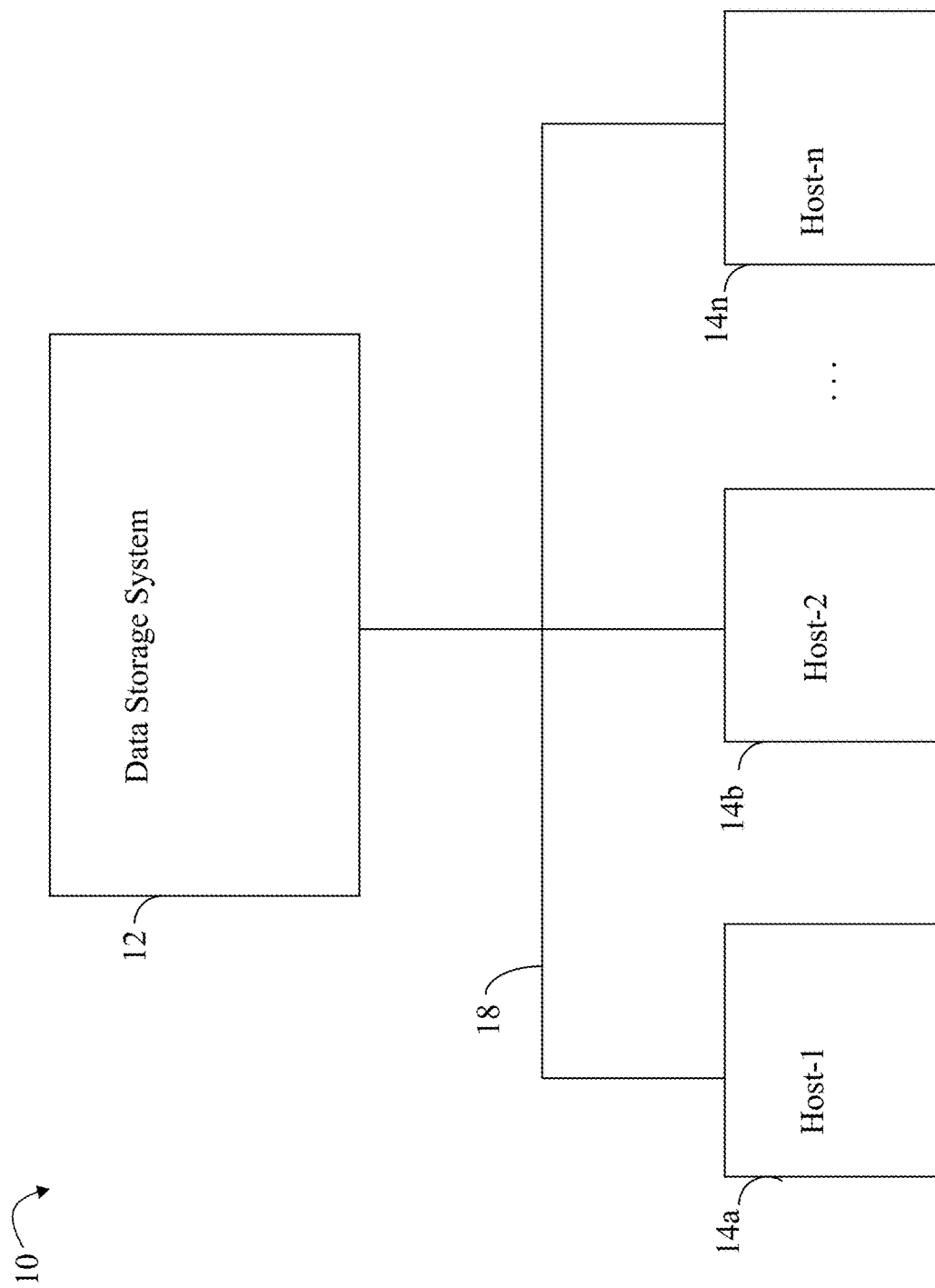
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
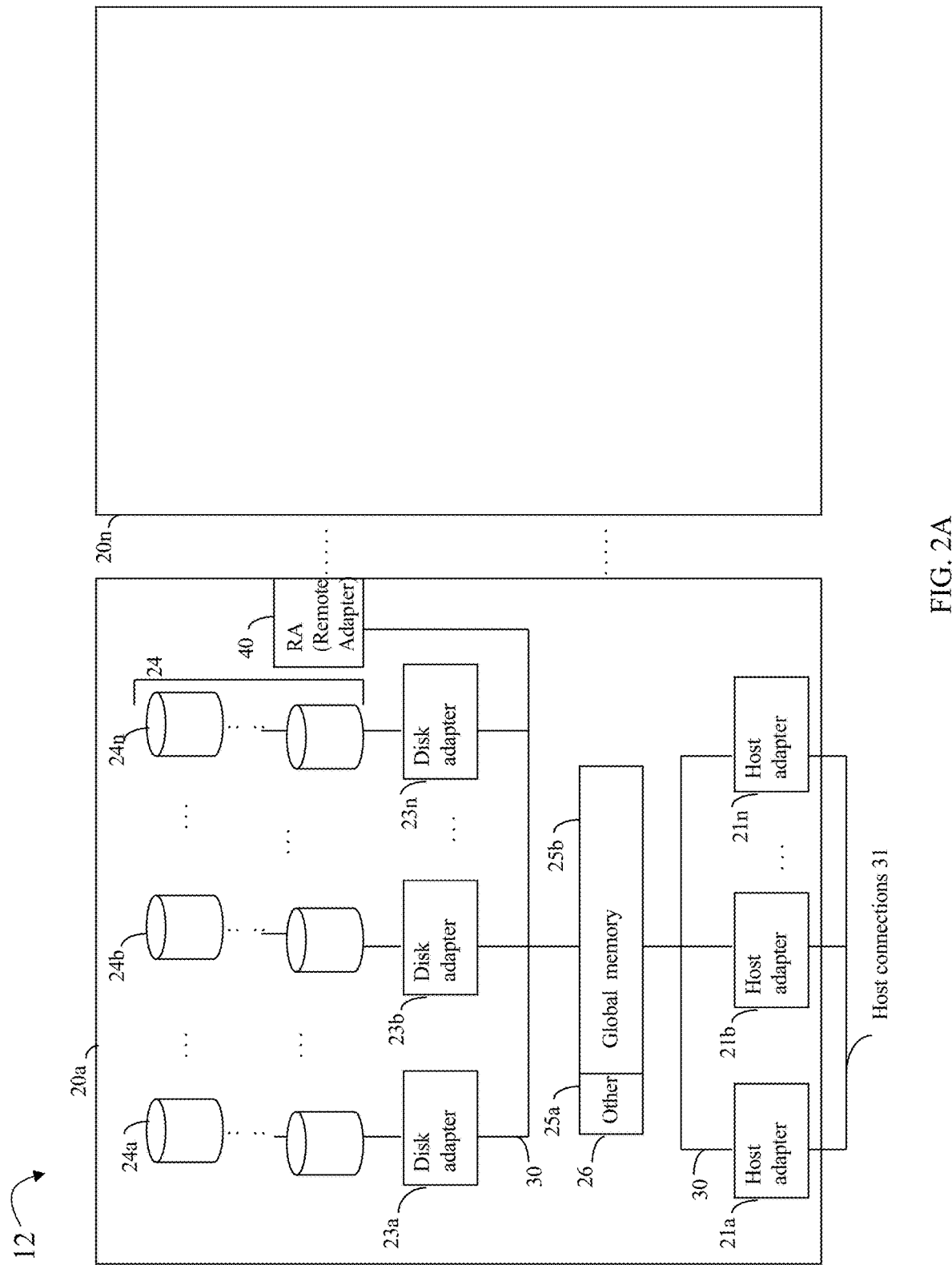
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25*b*) and marked as write pending. Once written to the cache, the host may be notified that the write operation has completed. At a later point time, the write data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
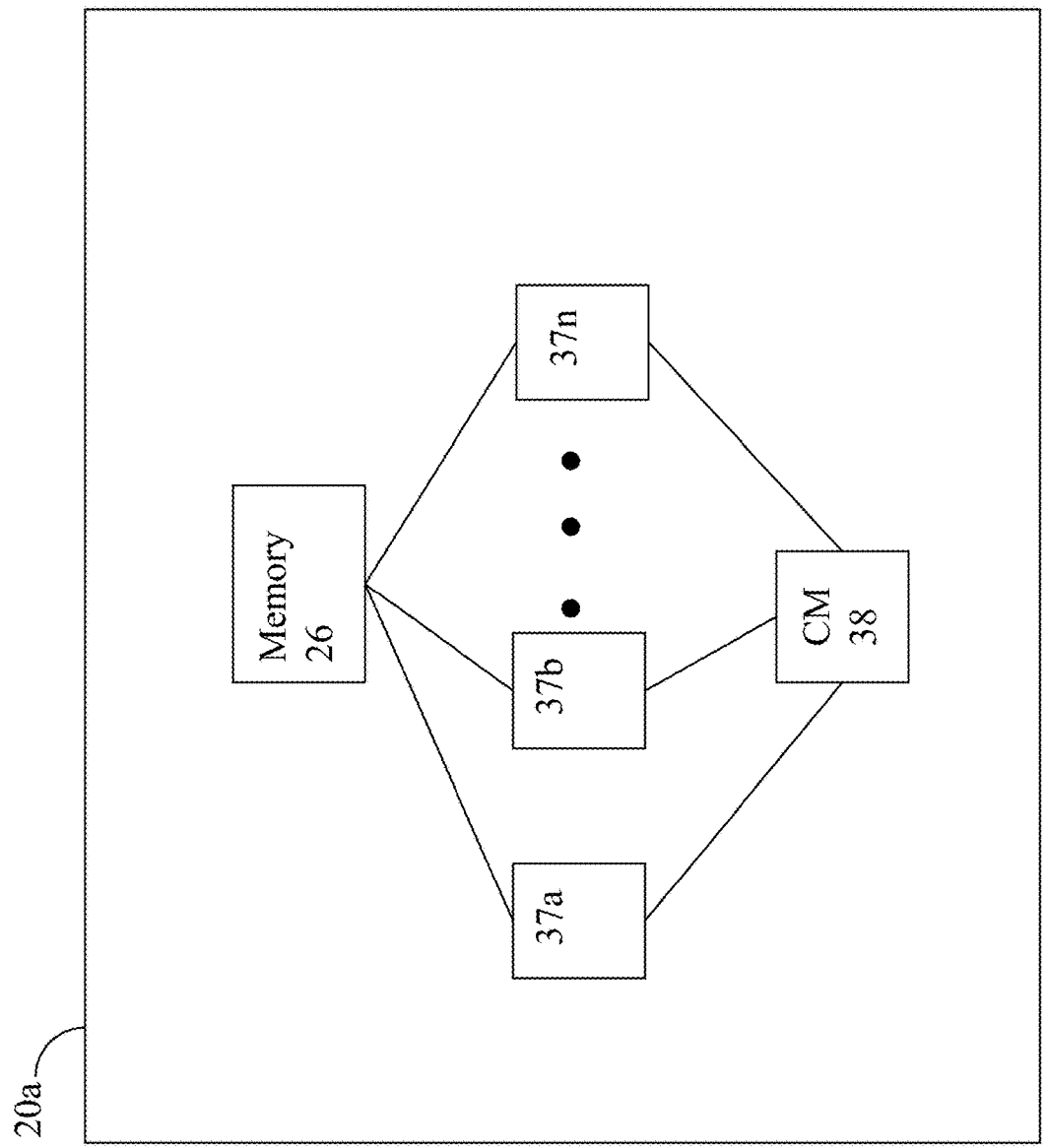
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37*a*-37*n* coupled to the memory 26. Each of the directors 37*a*-37*n* represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX (multiplexer)/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression.

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

In at least one embodiment, the replication facilities may include remote data replication facilities such as the Symmetrix Remote Data Facility (SRDF®) products provided by Dell Inc. SRDF® is a family of products that facilitates the data replication from one storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein. For a local copy of a LUN or logical device on a first data storage system, SRDF provides for automatically creating and maintaining a remote physical copy on a remote data storage system. The remote copy may be used, for example, in the case of a site disaster of the first data storage system.

Data storage device communication between data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Described in following paragraphs are techniques that may be used to provide a customizable dynamic dashboard showing complex relationships between a primary storage object instance and related storage objects. The dynamic dashboard displayed may include charts of metrics for the primary object and the related storage objects. Each chart may be, for example, a graph or table of one or more metrics. In at least one embodiment, a first chart may be displayed including one or more metrics of the primary object and a second chart may be displayed including one or more metrics for at least one related object, where the at least one related object is deemed related to the primary object. The primary object and its related objects may be storage objects where each such storage object corresponds to a logical or physical entity in the data storage system. The one or more related objects vary with the particular primary object. Additionally, the primary object is an instance of a particular primary object category, and each of the related objects is an instance of a particular related object category. The one or more related object categories (e.g., related to one of the primary object categories) may vary with each primary object category. Additionally, the related object instances may vary with each particular primary object instance depending on the current data storage system configuration.

A runbook definition may be provided or created for the dynamic dashboard. In one aspect, the runbook definition may be characterized as a customized dynamic template that may be subsequently applied or activated with respect to object instances in a current data storage system configuration. A runbook definition may be created that identifies a primary object category (also sometimes referred to as a primary category), a first chart definition that identifies one or more metrics to be displayed in a chart about an object instance of the primary object category, a related object category (also sometimes referred to as a related category), and a second chart definition that identifies one or more metrics to be displayed in a chart about an object instance of the related object category. Generally, in at least one embodiment, the runbook definition may include at least one primary object category, at least one chart definition to display information about the primary object category, at least one related object category for a primary object category of the runbook definition, and at least one chart definition to display information about one related object category of the runbook definition.

For example, a storage group may be a primary object category and, for the storage group primary object category, LUN or logical device may be a related object category. The runbook definition, RB1, may identify the storage group as the primary object category and the logical device as an applicable related object category. The runbook definition RB1 may also include a first chart definition for the storage group primary category, where the first chart definition identifies one or more storage group metrics to be included in a first chart for a storage group object instance. The runbook definition RB1 may also include a second chart definition that identifies one or more LUN or logical device metrics to be included in a second chart, where the second chart definition identifies one or more LUN metrics to be included in the second chart for a LUN object instance.

The above-mentioned runbook definition RB1 may be loaded and then activated or applied for use at a first point in time with a particular storage group instance in the current data storage system configuration. For example, the current data storage system configuration may include two or more defined SGs. A user may activate or apply the runbook definition RB1 for use with a selected SG, such as SG1, that is one of the SGs defined in the current data storage system configuration. Activating or applying the runbook definition RB1 for use with SG1 results in updating the GUI of the data storage system management application in accordance with the first chart definition to include the first chart of metrics for SG1. Additionally, all object instances of the related object category "logical device" or "LUN" currently in the data storage system configuration are analyzed to determine related logical device instances for the storage group SG1. Within a storage group context, such analysis identifies the particular logical devices or LUNs included in SG1. For example, LUN A and LUN B may be the two LUNs included in SG1. The GUI display is then updated in accordance with the second chart definition to include the second chart of metrics for LUN A and LUN B. In this manner, the runbook definition is used as a template that is applied to a selected instance of a primary storage object and its related object instances.

At a second point in time subsequent to the first point in time, the same runbook definition RB1 may be applied or activated for use with a second storage group instance in the current data storage system configuration. For example, the current data storage system configuration may include two or more defined SGs. A user may select to activate or apply the runbook definition RB1 for use with SG2 that is another of the SGs defined in the current data storage system configuration. Activating or applying the runbook definition RB1 for use with SG2 results in further updating the GUI of the data storage system management application in accordance with the first chart definition to include a third chart of metrics for SG2. Additionally, all object instances of the related object category "logical device" or "LUN" currently in the data storage system configuration are analyzed to determine related logical device instances for the storage group SG2. Within a storage group context, such analysis identifies the particular logical devices or LUNs included in SG2. For example, LUN C and LUN D may be the two LUNs included in SG2. The GUI display is then updated in accordance with the second chart definition to include a fourth chart of metrics for LUN C and LUN D. In this manner, the runbook definition may be used as a template applied multiple times to multiple primary storage object instances and related object instances.

In at least one embodiment, the runbook definition may be persistently stored in a database or other suitable storage container. The runbook definition may have an associated runbook name used to uniquely access the runbook definition. In some embodiments, an existing runbook definition may be loaded for use with the data storage management application and the runbook definition may be updated or modified to provide for further customization of the runbook. Such updates to the runbook definition may include, for example, adding a new chart for the primary object category or a related object category, modifying an existing chart definition such as by removing or adding a metric to the existing chart definition, adding a new related object category and associated new chart definition, deleting an existing chart, and the like. The modified or updated runbook may be persistently stored by replacing the existing runbook definition. The modified or updated runbook may be persistently stored as a new runbook without replacing or overwriting the existing original runbook definition.

In this manner, one or more runbook definitions may be created and stored in the database for use as a set of dynamic templates applied at various points in time to selected primary storage object instances to retrieve and display customized information about desired storage object instances in a current data storage system configuration. The techniques herein provide for automatically analyzing the current data storage system configuration to determine particular related category object instances that are related to a selected primary storage object instance. In at least one embodiment, such analysis may use predefined relationships between a primary object category and one or more related object categories to determine what particular related object instances are related to a particular primary object instance. For example, consistent with discussion elsewhere herein, a primary object category may be SG and there may be multiple related object categories for the SG primary object category. In particular, one of the related object categories for the SG primary object category may be LUN; a second related object category for the SG primary object category may be FE (front end) director, such as an FA that is a front end component of the data storage system; and a third related object category for the SG primary object category may be FE port or FE director port, such as a target data storage system port of an FA of the data storage system.

In at least one embodiment, the object categories and the relationships between different ones of the object categories may be predefined. For example, when creating a runbook definition, a user may select a primary object category from a list of predefined primary object categories. For the selected object category, a user may also select a related object category from a list of predefined related object categories. The list may generally include one or more predefined related object categories determined as related to the particular primary object category selected. Thus, the list of related object categories available for selection when creating or modifying a runbook definition may vary with the particular selected primary object category. For example, some related object categories may not be relevant or applicable for use with particular primary object categories. When activating or applying a runbook definition to a selected primary object instance of a particular primary object category, relationships between storage object instances are analyzed to identify related category object instances for the selected primary object instances.

In at least one embodiment, the data storage management application may execute in the context of a browser where the browser windows and views provide the GUI for the application.

The foregoing and other aspects of the techniques herein are described in more detail in following paragraphs.

Consistent with other discussion herein, the techniques herein may be used in at least one embodiment to provide a dynamic dashboard using a runbook definition. The dynamic dashboard may identify complex relationships between a primary storage object instance and related storage objects. Application or activation of the runbook template is performed with respect to a particular primary object instance of a primary object category included in the runbook definition. The application or activation results in analyzing the complex relationships between storage objects in the current data storage system configuration and allows aspects of such relationships to be displayed together in a single convenient dynamic dashboard of a GUI. The analysis automatically performed as a result of applying or activating the runbook definition removes the onus on users to determine the relationships between objects which can be time consuming and error prone.

In following examples, the techniques herein may be described with reference to an embodiment using a GUI of a data storage system management application, where the objects and object categories are, respectively, storage objects and storage object categories. More generally, the techniques herein may be used in connection with any suitable system, interface, application and objects.

What will now be described is processing as may be performed in at least one embodiment in accordance with the techniques herein when using a GUI of a data storage management application for managing a data storage system. The commands may be issued using various UI controls of the data storage management application. The commands may be issued over the control path.

Figure 3A:
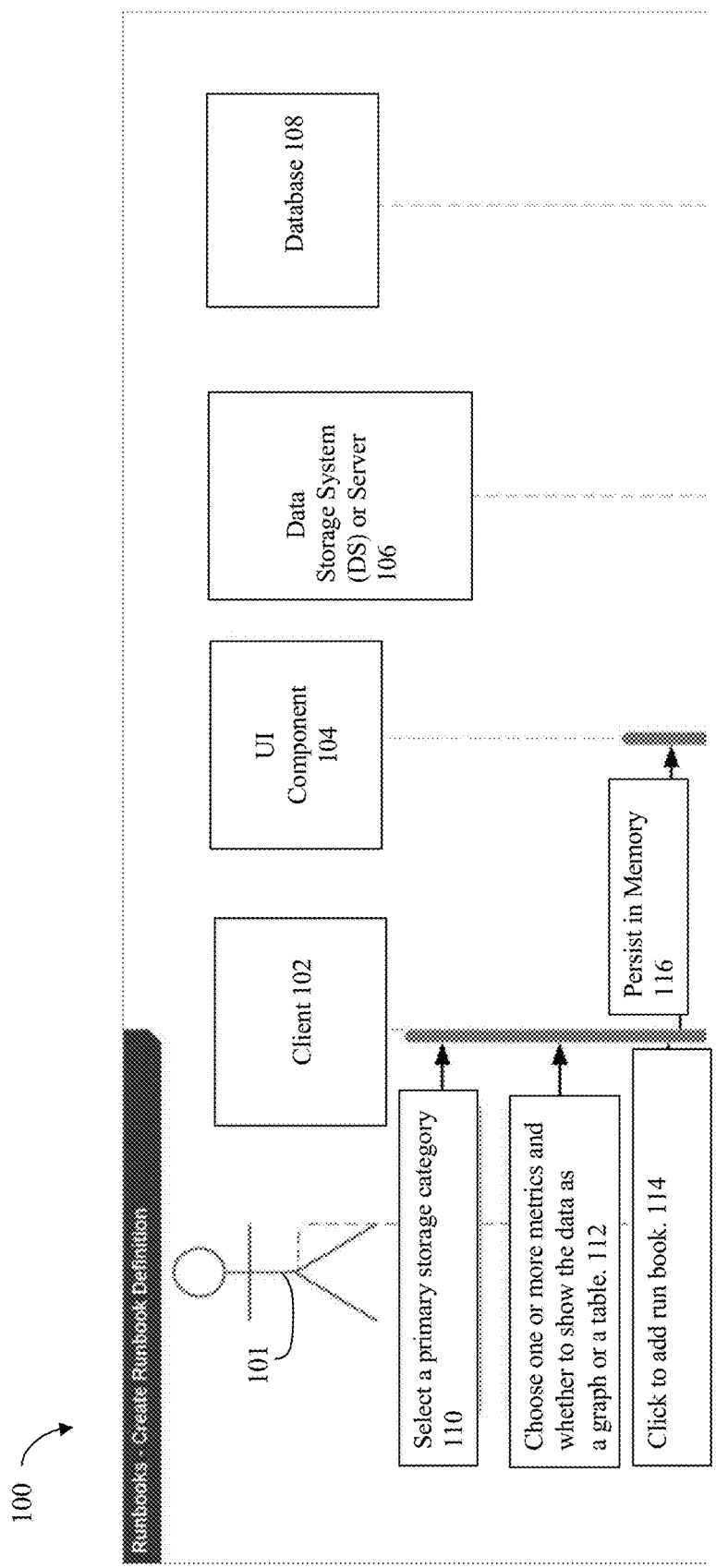
FIGS. 3A, 3B, 3C and 4 are sequence diagrams of processing that may be performed in an embodiment in accordance with the techniques herein.
Figure 3B:
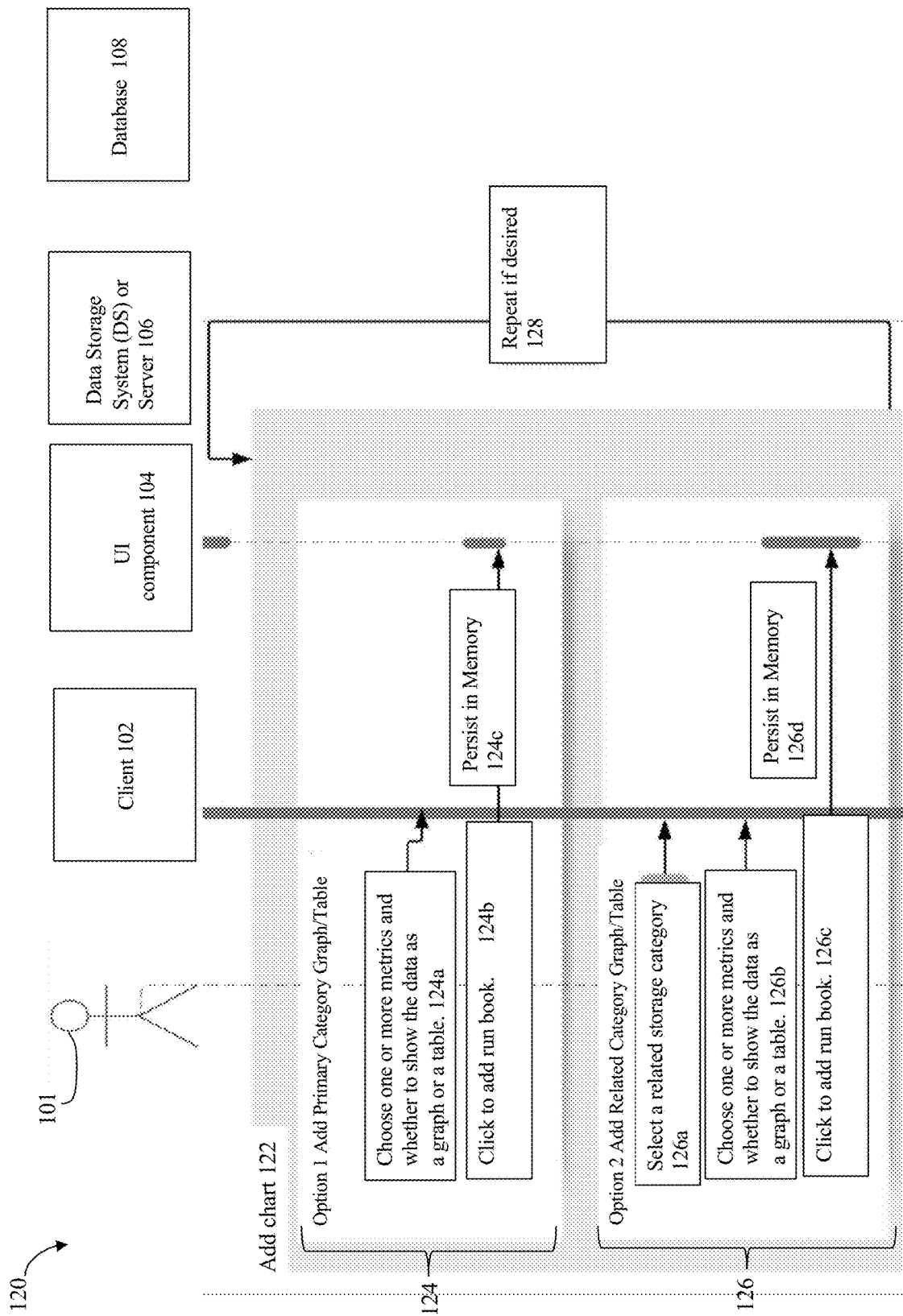
Figure 3C:
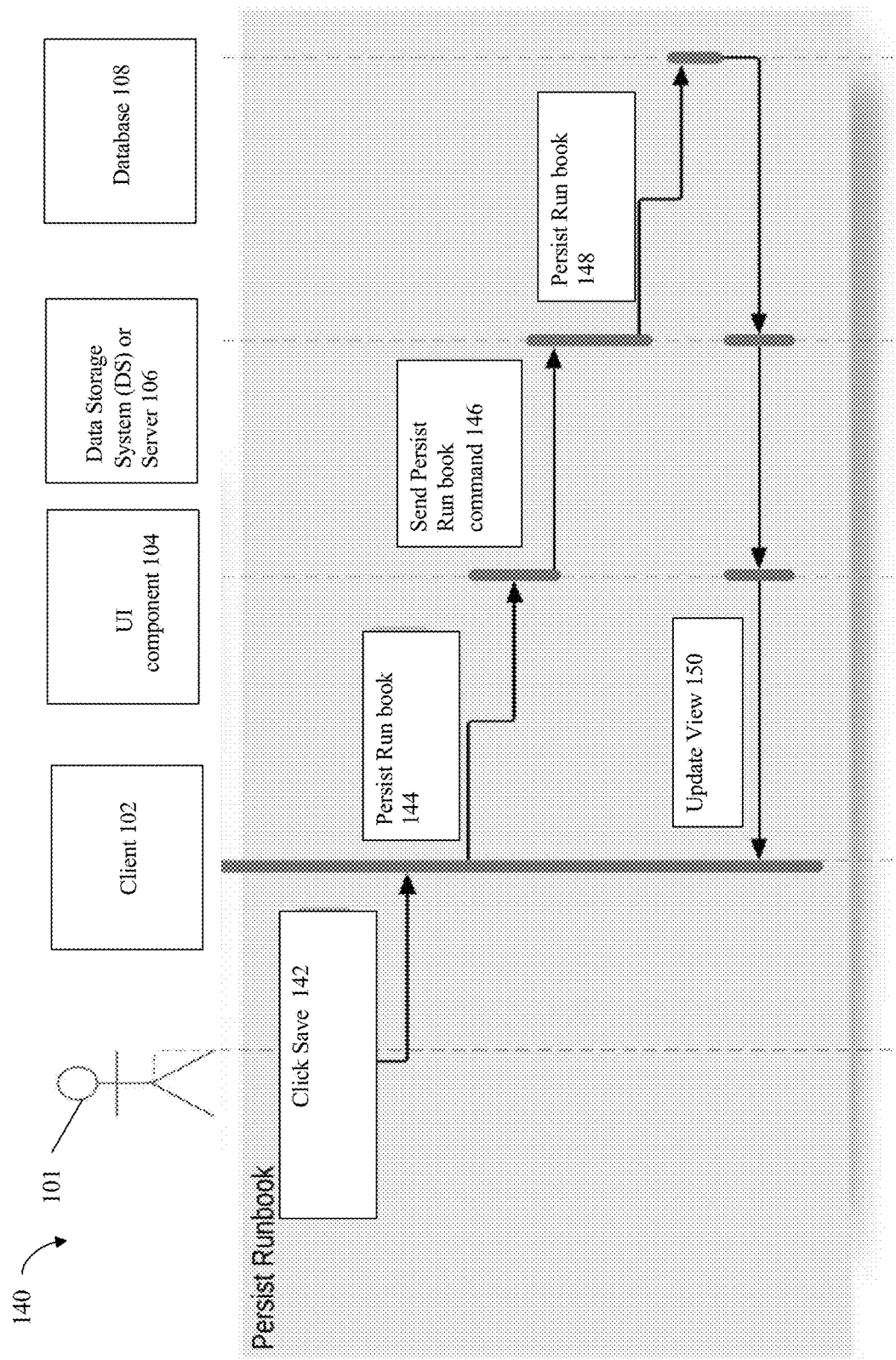

Referring to FIGS. 3A-3C, shown are sequence diagrams of processing that may be performed in at least one embodiment in accordance with the techniques herein to create a runbook definition. In the FIGS. 3A-3C, shown are processing steps that may be performed in connection with components of at least one embodiment, where the components include a user 101, client computer system or client 102, UI component 104 such as a UI component of the data storage system management application, a data storage system (DS) or server 106, and a database 108.

In the example 100 of the FIG. 3A, a user selected a primary storage category in the step 110. The selection in the step 110 may be performed using a GUI of the data storage management application as displayed in a browser of the client 102. After the step 110, processing may be performed in the step 112 where a user may also select one or more metrics about the primary object category, where the selected metrics are included in a chart definition of the runbook definition. The one or more metrics may be selected from a menu of the GUI providing a list of relevant metrics for the particular primary object category. Additionally, in the step 112, a user may specify additional properties or attributes of the chart definition. For example, in at least one embodiment, the chart may be a graph or table. Thus, the step 112 may also include indicating whether the chart definition for the primary storage object category is a graph or a table, whereby the one or more metrics selected in the step 112 are to be displayed, respectively, in a graph or a table. From the step 112, processing proceeds to the step 114. At the step 114, the user 101 selected to add the runbook definition, resulting in the runbook definition being persistently stored in the memory of the UI component 104. From the step 114, control proceeds to the processing as illustrated in the example 120 of the FIG. 3B.

Referring to the example 120 of the FIG. 3B, the user 101 may be presented with two options in the step 122 to add a new chart. The two options in the step 122 are denoted by the elements 124 and 126. The option 1, denoted by 124, may be selected to add another chart for the selected primary object category (e.g., selected in the step 110). The option 2, denoted by 126, may be selected to add a chart for a related object category. Generally, as illustrated by the step 128, the user 101 may repeatedly select and perform one of the options 124, 126 any suitable number of times for the current runbook definition being created.

If the user 101 selects option 1 124, the user 101 makes selections in the steps 124a using the GUI to define another chart definition of one or more metrics for the selected primary object category. The step 124a is similar to the step 112. From the step 124a, control proceeds to the step 124b where the user selects to add the new primary object category chart definition to the current runbook definition. As a result of performing the step 124b, the added chart for the primary object category is persistently stored in the memory of the UI component 104.

If the user 101 selects option 2 126, the user 101 makes selections in the steps 126a-c using the GUI to define a chart definition of one or more metrics for a related object category. At the step 126a, the user selects a related object category, such as from a displayed list or menu of related object category candidates. Depending on the previously selected primary object category selected in the step 110, the related object categories may be different. Based on the selected primary object candidate, an embodiment may display only relevant related object category candidates to the user for potential selection. The particular related object candidates may vary with the particular primary object. For example, as will be further illustrated in connection with other figures and paragraphs herein, the runbook definition may define a dynamic template for user with a primary object category of SG. Relevant related object categories may include LUN and FE port. However, other related object categories defined in the system may not be relevant for a primary category of SG but may be relevant for other primary object categories. Thus an embodiment may selectively display related object categories that vary with the different selected primary objects category.

From the step 126a, control proceeds to the step 126b where the user makes selections using the GUI to define a chart definition of one or more metrics for the selected related object category. The one or more metrics may be selected from a menu of the GUI providing a list of relevant metrics for the particular selected related object category. From the step 126b, control proceeds to the step 126c, where the user selects to add the new related object category chart definition to the current runbook definition. As a result of performing the step 126c the added chart for the related object category is persistently stored in the memory of the UI component 104.

After the user performs the processing of the step 122, control may proceed to either the step 128, or continue with the processing of FIG. 3C. Control may proceed to the step 128 to add another chart definition to the current runbook definition, whereby control returns to the step 122. Alternatively, control may continue with the processing of FIG. 3C as described below.

Referring to the example 140 of the FIG. 3C, the user 101 may perform processing to persistently store the runbook definition in the database 108. As illustrated in the FIG. 3C, the user may select a UI option to save the runbook definition in the step 142, which results in issuing a persist runbook command 144 from the client 102 to the UI component 104, issuing a persist runbook command 146 from the UI component 104 to the DS or server 106, and issuing a persist runbook command 148 from the DS or server 106 to the database 108. In response to storing the runbook definition in the database 108, a response may be returned back up the call chain of components to the client 102 resulting in an updated view 150 in the displayed GUI. As described in more detail elsewhere herein, the updated view 150 may include information indicating that the runbook definition has been successfully stored in the database 108 and indicating the different charts and object categories of the created runbook definition now stored in the database 108. The GUI of the data storage system management application may include a list of runbook definitions persistently stored in the database 108, where the list is updated in the view 150 to include the newly created and stored runbook definition.

At this point in processing, the runbook definition has been created and persistently stored in the database 108. At a later subsequent point in time, the runbook definition may be retrieved and loaded for use with the data storage system management application.

Figure 4:
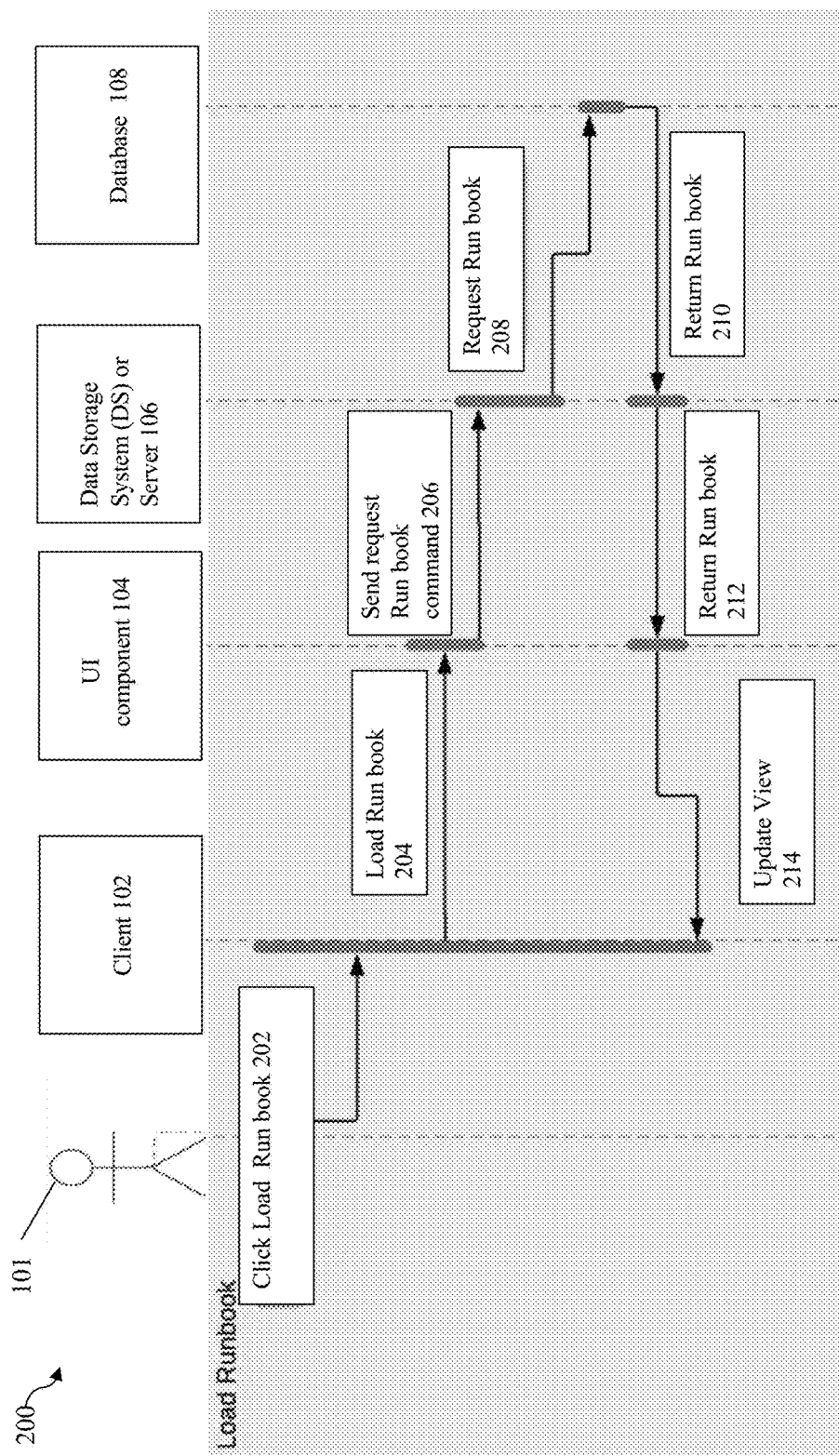

Referring to FIG. 4, shown is an example 200 of a sequence diagram illustrating processing that may be performed in an embodiment in accordance with the techniques herein for loading the runbook definition.

At the step 202, the user 101 selects a GUI option to load the runbook definition. In at least one embodiment, the user may select the desired runbook definition to be loaded from a displayed list of runbook definitions currently stored in the database 108. Responsive to performing the step 202, a load runbook request 204 for the selected runbook definition is sent from the client 102 to the UI component 104, sent 206 from the UI component 104 to the DS or server 106, and then sent 208 from the DS or server 106 to the database 108. The requested runbook definition identified in the request 208 may be retrieved from the database 108 and returned (210) to the DS or server 106, and then subsequently returned (212) to the UI component 104. In response to receiving the requested runbook definition in the response 212, the UI component 104 may perform processing to update the view 214 of the GUI display to include the runbook definition. As described in more detail below, the view in the step 214 may be updated to include the chart definitions and selected object categories of the runbook definition.

Figure 5:
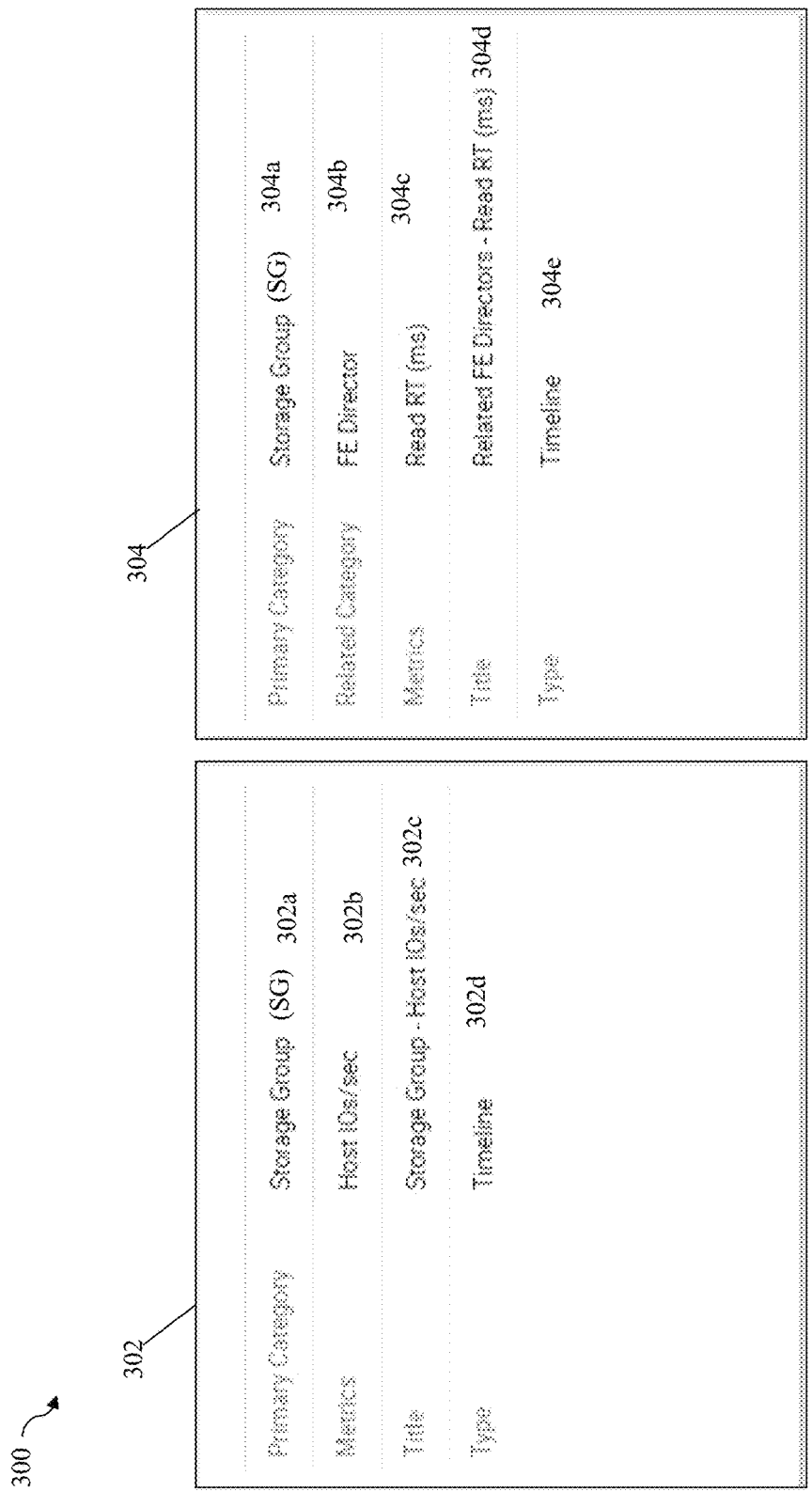
FIG. 5 is an example of a screenshot illustrating a runbook definition in an embodiment in accordance with the techniques herein.

For example, reference is made to the example 300 of FIG. 5 which illustrates information that may be displayed as a result of updating the view of the GUI in the step 214 for a loaded runbook definition. In this example 300, the runbook definition that is loaded includes two chart definitions 302, 304. The first chart definition 302 is for the primary object category of SG 302a in which a single metric of host I/Os per second 302b is displayed as a time-line graph 302d. The first chart definition also has the title Storage Group-Host IOs/sec as denoted by 302c. In at least one embodiment, the title 302c may be optionally specified and provided by the user, for example, in connection with the processing of the FIG. 3A. More generally, such an embodiment may include processing that allows the user to optionally specify a title for any chart added, such as in connection with the steps 124 and 126 of FIG. 3B.

The second chart definition 304 provides a chart definition of a related object category of the primary object category of SG 304a. The related object category of 304 is FE director 304b in which a single metric of read response time (RT) 304c is displayed in milliseconds (ms) as a time-line graph 304e. The second chart definition also has the title Related FE Directors—Read RT (ms) as denoted by 304d.

Thus, the FIG. 5 illustrates an example of information that may be displayed in the GUI of the data storage system management application after loading a requested runbook definition from the database 108. As can be seen from the example 300 of FIG. 5, the runbook definition displayed defines the template of information that may be activated and applied to particular object instances of the specified primary and related object categories of the runbook definition.

After loading the runbook definition as in the FIG. 5, the user 101 may specify a particular object instance of the primary object category SG 302a. For example, assume the user selects SG1 as the SG instance to which the runbook definition of FIG. 5 is applied. Upon choosing the instance SG1, all primary category charts of the loaded runbook definition are dynamically updated in the GUI to show the data for this selected instance. Additionally, upon selecting the instance SG1, all related category object instances are analyzed and the GUI may be dynamically updated to show the data for the particular related object categories of the loaded runbook definition.

Figure 6:
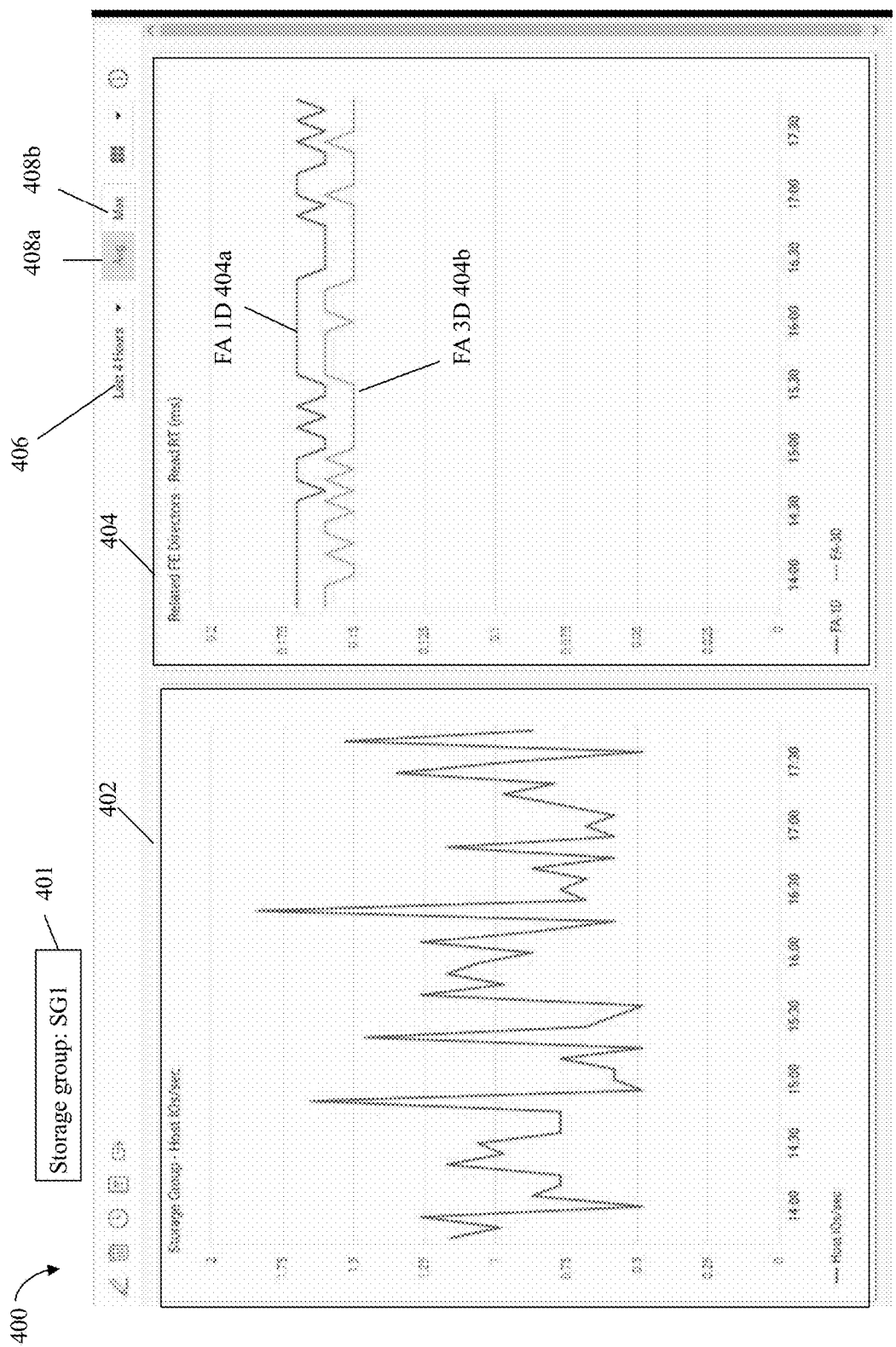
FIGS. 6, 7, 11, 12 and 13 are examples of screenshots illustrating activation or application of a runbook definition to particular primary and related object instances in an embodiment in accordance with the techniques herein.

Referring to FIG. 6, shown is an example 400 of the GUI display as updated in response to selecting the SG1 instance for the loaded runbook definition of FIG. 5 in an embodiment in accordance with the techniques herein.

In the example 400, the element 401 may denote the particular SG instance, SG1, selected for activation or application with the loaded runbook definition of FIG. 5. In at least one embodiment, the user may be presented with a drop down menu or list of currently defined SGs in the system from which the user selects SG1 401 in this example. The graph 402 may denote the chart of the dashboard displayed in the GUI for the first chart definition 302; and the graph 404 may denote the chart of the dashboard displayed in the GUI for the second chart definition 304.

The chart 402 is a primary object category chart that is updated to show the metric host I/Os per second for the selected SG1. The chart 402 is a graph with time displayed on the X axis and the metric host I/Os per second on the Y axis for SG1.

The chart 404 is a related object category chart that is updated to show the metric read RT for the particular FE directors used in connection with servicing I/Os directed to LUNs of SG1. The chart 404 is a graph with time displayed on the X axis and the metric read RT on the Y axis for SG1. In this example, the data storage system configuration may expose LUNs of SG1 through ports of two FE directors, FA 1D and FA 3D. The line 404a denotes the graphical timeline of read RT for FA 1D; and the line 404b denotes the graphical timeline of read RT for FA 3D. Thus the related object category chart 404 is updated to display the selected metric, read RT, for the one or more FAs or FE directors that are associated with the selected SG1 instance.

Based on the foregoing, the runbook definition of FIG. 5 specifies the selected primary and related object categories about which desired metrics of the charts 302, 304 are displayed. Upon selection of a particular primary object category instance SG1 for the runbook definition of FIG. 5, the dashboard in the GUI is updated to display the charts of FIG. 6. Thus, the runbook definition is applied to a particular primary and related object category instances.

Figure 7:
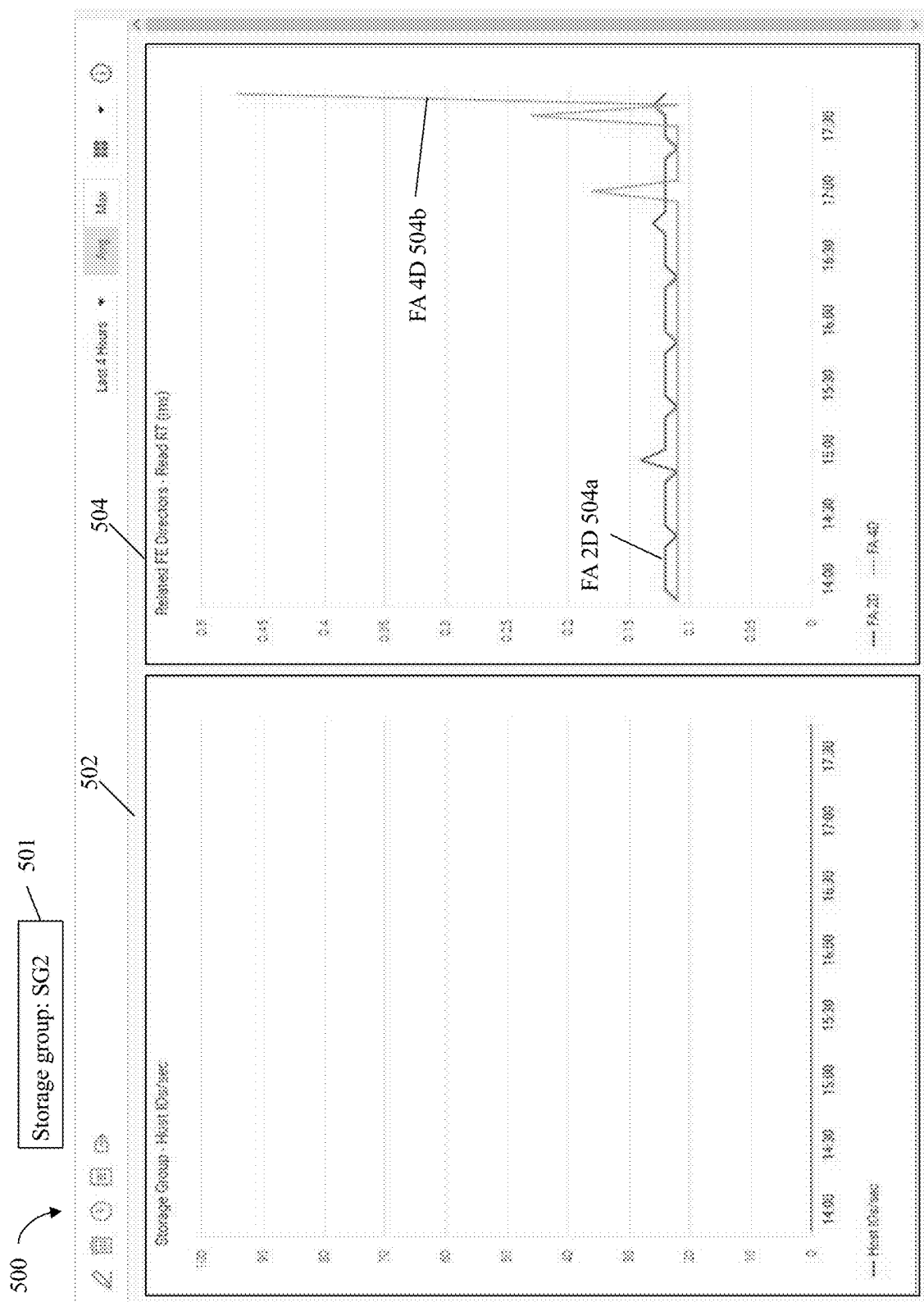

In a similar manner, the same runbook definition may be further activated or applied in connection with one or more other selected SG instances. In other words, the runbook definition is applied as a template for use in connection with one or more SG instances. For example, reference is made to FIG. 7 where a user selects a second different SG instance for use with the loaded runbook definition of FIG. 5.

In the example 500, the element 501 may denote the particular SG instance, SG2, selected for activation or application with the loaded runbook definition of FIG. 5. In at least one embodiment, the user may be presented with a drop down menu or list of currently defined SGs in the system from which the user selects SG2 501 in this example. The graph 502 may denote the chart of the dashboard displayed in the GUI for the first chart definition 302; and the graph 504 may denote the chart of the dashboard displayed in the GUI for the second chart definition 304.

The chart 502 is a primary object category chart that is updated to show the metric host I/Os per second for the selected SG2. The chart 502 is a graph with time displayed on the X axis and the metric host I/Os per second on the Y axis for SG2.

The chart 504 is a related object category chart that is updated to show the metric read RT for the particular FE directors used in connection with servicing I/Os directed to LUNs of SG2. The chart 504 is a graph with time displayed on the X axis and the metric read RT on the Y axis for SG2. In this example 500, the data storage system configuration may expose LUNs of SG2 through ports of two FE directors, FA 2D and FA 4D. The line 504a denotes the graphical timeline of read RT for FA 2D; and the line 504b denotes the graphical timeline of read RT for FA 4D. Thus the related object category chart 504 is updated to display the selected metric, read RT, for the one or more FAs or FE directors that are associated with the selected SG2 instance.

Figure 8:
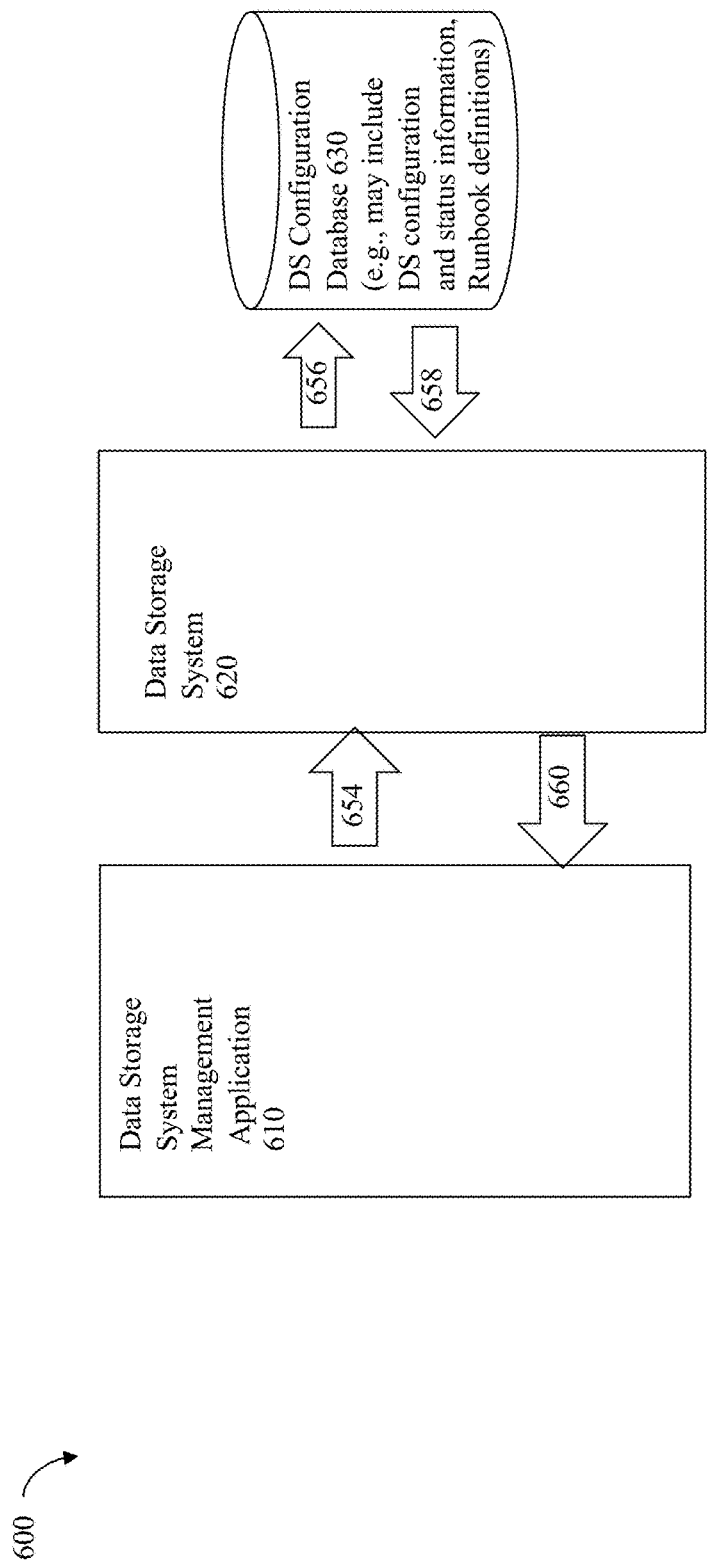
FIG. 8 is an example illustrating components and data flow in an embodiment in accordance with the techniques herein.

Referring to FIG. 8, shown is an example of systems and components that may be used in an embodiment in accordance with the techniques herein in connection with creating, loading and running or activating a runbook definition. The runbook definition may be created as described above (e.g., FIGS. 3A-3C) using a GUI of the data storage system management application 610. The runbook definition may be persistently stored in the data storage system (DS) configuration database 630. Consistent with discussion herein, the runbook definition may be persistently stored by sending (654) the runbook definition from the application 610 to the data storage system 620. Subsequently, the data storage system 620 may issue one or more requests 656, such as database update operations, to the database 630 to perform the necessary updates to the database 630 to store the runbook definition in the database 630.

In at least one embodiment, the database 630 may be stored on the data storage system 620. As a variation, the database 630 may be located on a different system, such as at a different location accessible via a network connecting the data storage system 620 and the database 630.

In connection with loading a persistently stored runbook definition from the database 630 for use with the application 610, in at least one embodiment, the application 610 may issue a request (654) for the runbook definition to the data storage system 620. Subsequently, the data storage system 620 may issue one or more requests 656, such as database queries, to the database 630 to retrieve the requested runbook definition. A response including the requested runbook definition may be returned 658 from the database 630 to the data storage system 620, and then further returned 660 to the data storage system management application 110.

In at least one embodiment in accordance with the techniques herein, the data storage system management application 110 may execute in the context of a browser.

The DS configuration database 630 may include the persistently stored runbook definitions and may also generally include information about the data storage system 620. For example, in at least one embodiment, the database 130 may include data storage system configuration, performance, and status information. For example, the database 630 may include data storage system configuration information regarding the various physical and logical storage objects or entities in the data storage system (e.g., configured SGs, provisioned LUNs, configured RAID groups). The database 630 may, for example, identify what LUNs are included in an SG, what hosts and initiator ports of hosts have access to particular SGs, what LUNs or SGs are exposed over which particular front end (FE) data storage system ports of HAs or FAs, what one or more pools of RAID groups the LUNs have storage provisioned from, what physical storage devices are included in each pool and associated RAID group configuration, the particular RAID level of a RAID group, what is the capacity of a LUN, what is the amount of used and free storage of SGs, LUNs, and RAID groups, and the like. Information regarding the performance of the physical and/or logical storage entities in the data storage system and the current configuration of the physical and/or logical storage entities in the data storage system may be used in connection with displaying information about a particular primary object instance and its related object instances when applying a runbook definition in an embodiment in accordance with the techniques herein.

What will now be described are various screenshots that may be presented in a GUI of a data storage management application in an embodiment in accordance with the techniques herein. The following FIG. 9A-9G illustrate screenshots of a workflow in connection with defining or creating a runbook definition, loading the runbook definition, and then activating or applying the runbook definition to a selected primary object category instance. The FIGS. 9A-9G generally illustrate screenshots that may be included in the workflow described above such as in connection with the FIGS. 3A-3C, FIG. 4, FIG. 5 and FIG. 6.

Figure 9A:
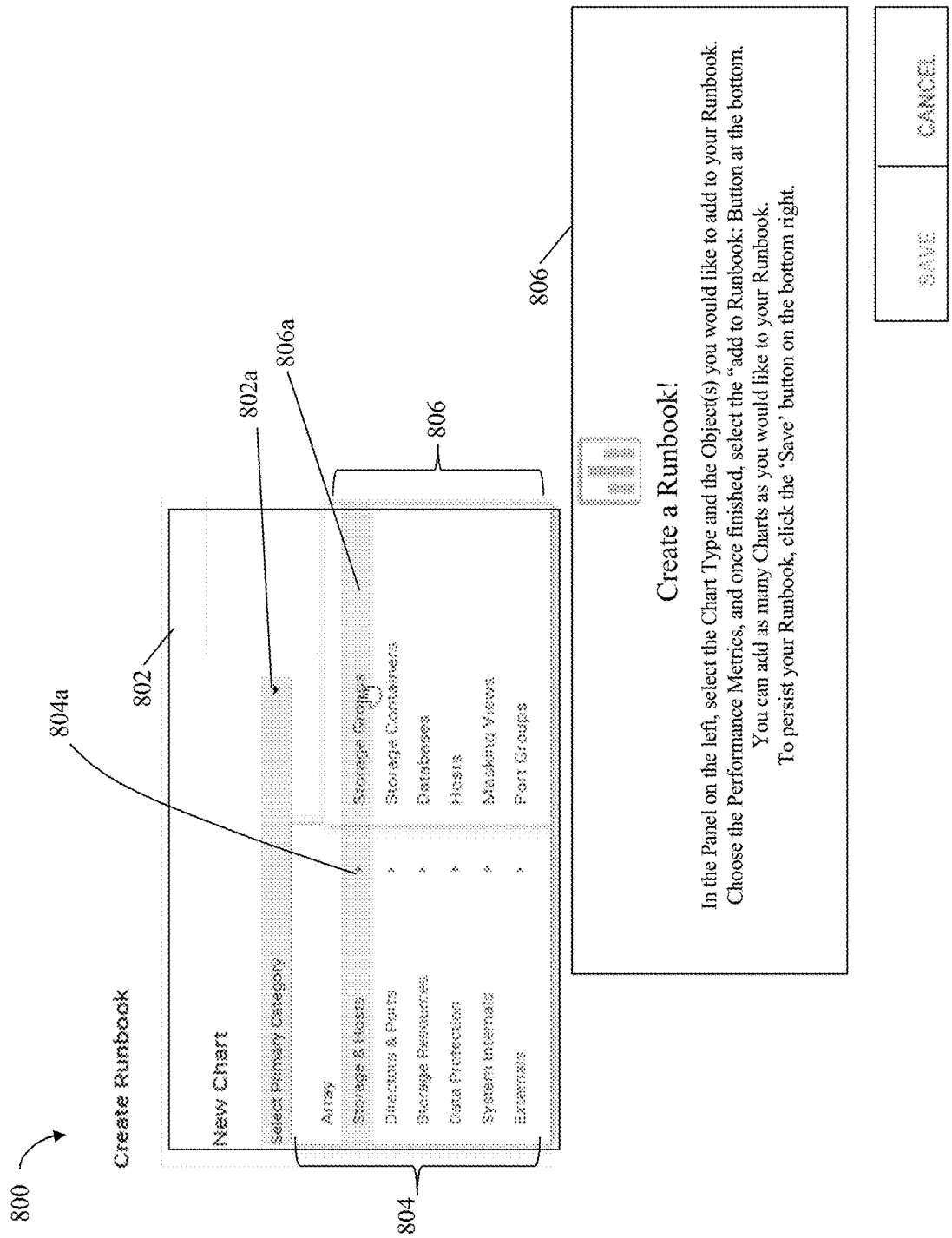
FIGS. 9A, 9B, 9C, 9D, 9E, 9F and 9G illustrate screenshots included in a workflow in connection with creating and using a runbook definition in an embodiment in accordance with the techniques herein.

Referring to FIG. 9A, shown is a first screenshot that may be displayed in a GUI in an embodiment in accordance with the techniques herein. The example 800 includes display 802 that may be used in connection with selecting a primary object category. A user may first select primary category 802a as the action to be performed. In response to selecting 802a, a first level or list of primary object categories 804 may be displayed. In this example, the first level or list 804 includes array, storage & hosts, directors & ports, storage resources, data protection, system internals and externals. In the example 800, a user selects storage and hosts 804a. In response to selecting 804a, a second level or list of primary object categories may be displayed. The second level or list 806 may be further primary object categories falling within the general category of storage & hosts 804a. In this example, the user selects storage groups 806a to selected the primary object category SG.

Figure 9B:
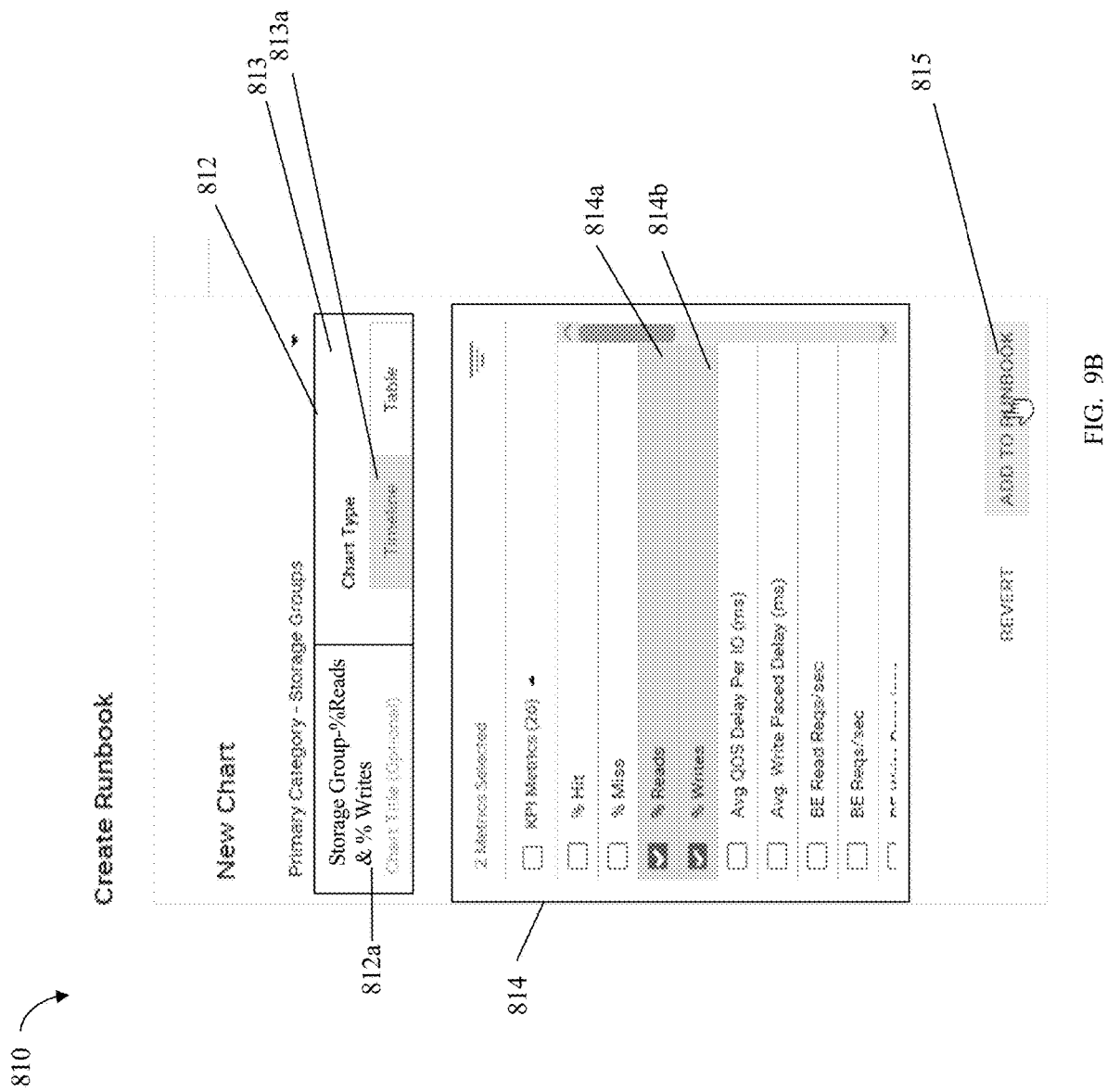

In response to selecting 806a, processing may proceed with information as illustrated in the screenshot 810 of FIG. 9B. In the screenshot 810, the user may be presented with information in connection with defining a chart for the selected primary object category, SG. The user may be prompted to enter information into fields of the area 812. In particular, a user may enter an optional title for the chart in 812a. Additionally a user may select a chart type 813. In this example, a chart type 813 may be either a table or a timeline graph. In this example, the user selects timeline 813a denoting the timeline graph.

The user also selects one or more metrics to be displayed in the chart be selecting one or more metrics from the menu 814. The menu 814 may generally include relevant metrics for the particular selected primary object category selected, such as SG in this example. In this example, relevant metrics in the menu 814 may include % hit (denoting a percentage of I/Os that result in a cache hit), % miss (denoting a percentage of I/Os that result in a cache miss), % reads (denoting a percentage of I/O operations that are reads), % writes (denoting a percentage of I/O operations that are writes), avg QOS delay per 10 (denoting the average additional I/O delay added), avg write paced delay (denoting the average time in milliseconds that host writes on RDF devices are delayed by the RA or RDF directors), BE read reqs/sec (denoting the number of back end read requests of data from the backend PDs per second), and BE reqs/sec (denoting the number of back end requests to read from and/or write data to the backend PDs per second).

In connection with the avg write paced delay metric in the menu 814, a remote data facility (RDF) performing remote replication as described herein may perform write pacing with respect to host writes to a LUN that is remotely replicated using RDF to prevent conditions that may result in cache overflow on both the R1 and R2 data storage systems. In at least one embodiment, processing may be performed to detect when the write I/O rate (e.g., for writes used to replicate data from the R1 LUN to the remote R2 LUN) is less than host write I/O rates. A corrective action may then be performed to slow down or pace the host I/O rates to more closely match the RDF write I/O service rates. Thus, the avg write paced delay metric indicates the average amount of this delay introduced per write I/O operation for writes that replicate data from the R1 device and system to the R2 device and system.

In this example, the user selects 2 metrics—% reads 814a and % writes 814b. Subsequently, the user selects 815 to add the new chart definition defined in the FIG. 9B to the current runbook. Also, in response to selecting "add to runbook" 815, the GUI display may be updated to include the screenshot as in the FIG. 9C.

Figure 9C:
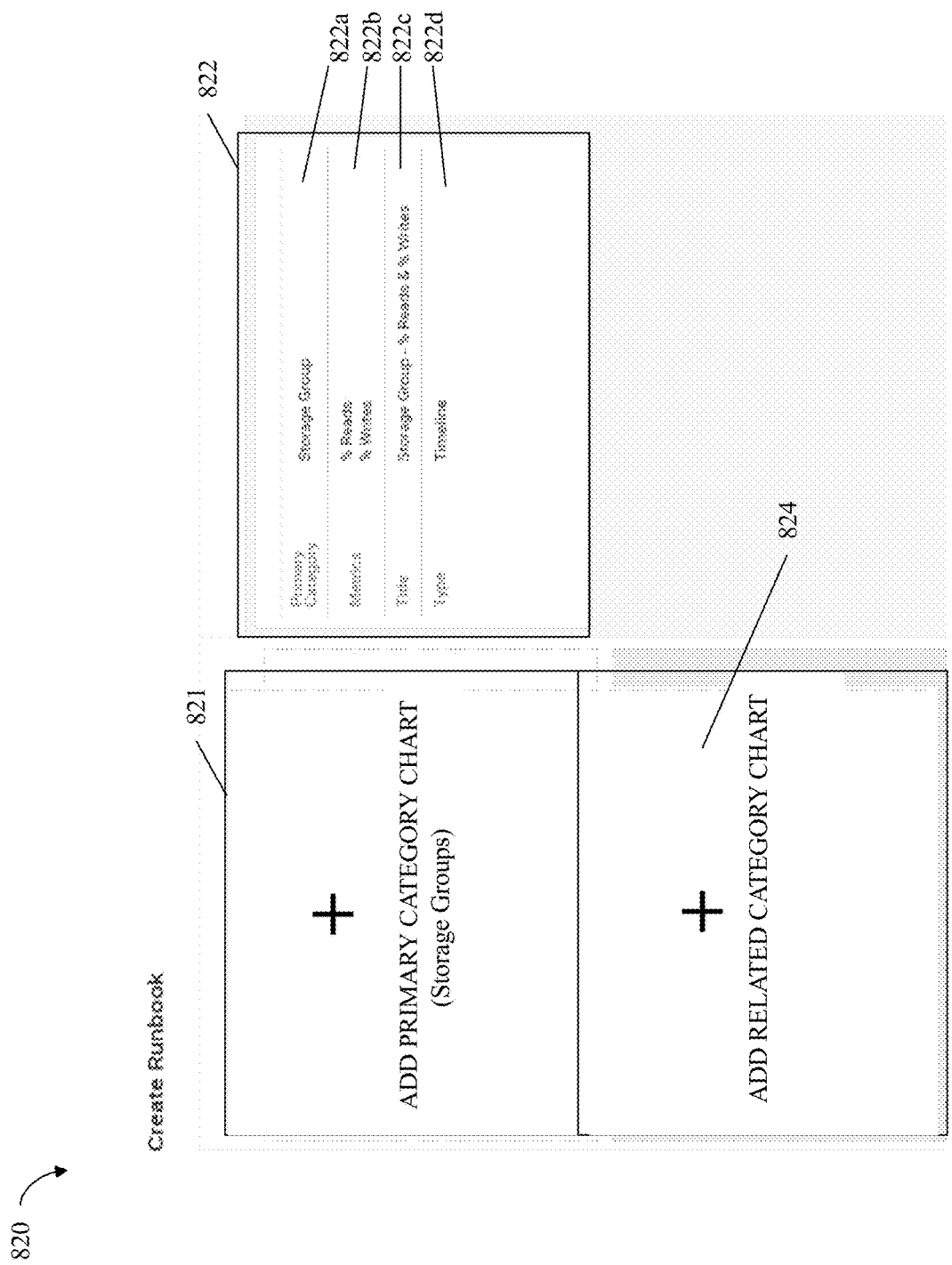

In the example 820 of FIG. 9C, the user may be presented with UI elements 821, 822 and 824. The UI element 822 may display the chart definition for the primary object category SG. The UI element 821 may be a UI control that may be selected if the user wants to create another chart definition for the SG primary object category for the current runbook. The UI element 824 may be a UI control that may be selected if the user want to create a chart definition for a related object category.

The UI element 822 in this example 820 displays the chart definition as created in connection with FIGS. 9A and 9B. In particular, the element 822 includes: 822a indicating that the chart definition is for the SG primary object category, 822b indicating the 2 selected metrics of % reads and % writes, 822c indicating the title for the chart, and 822d indicating the chart type as a timeline graph.

In this example, the user may select UI control 824 to now add a related category object chart. In response to selecting 824, the GUI may be updated to include information as displayed in connection with the screenshot of FIG. 9D to create the chart definition for a related object category.

The example 830 includes a first level or list of related object categories 834 relevant for the selected primary object category SG. The list 834 may be displayed in response to the user selecting 832 to select a related category. In this example, the list 834 may include items such as described in connection with the FIG. 9A. The user may select directors & ports 832a resulting in further display of a second level or list 833 of related object categories 833. The list 833 may include related object categories that fall into the broader or more general related category denoted by 832a. From the second list 833, the user may select FE ports 834a, denoting the front end or FA ports.

Figure 9D:
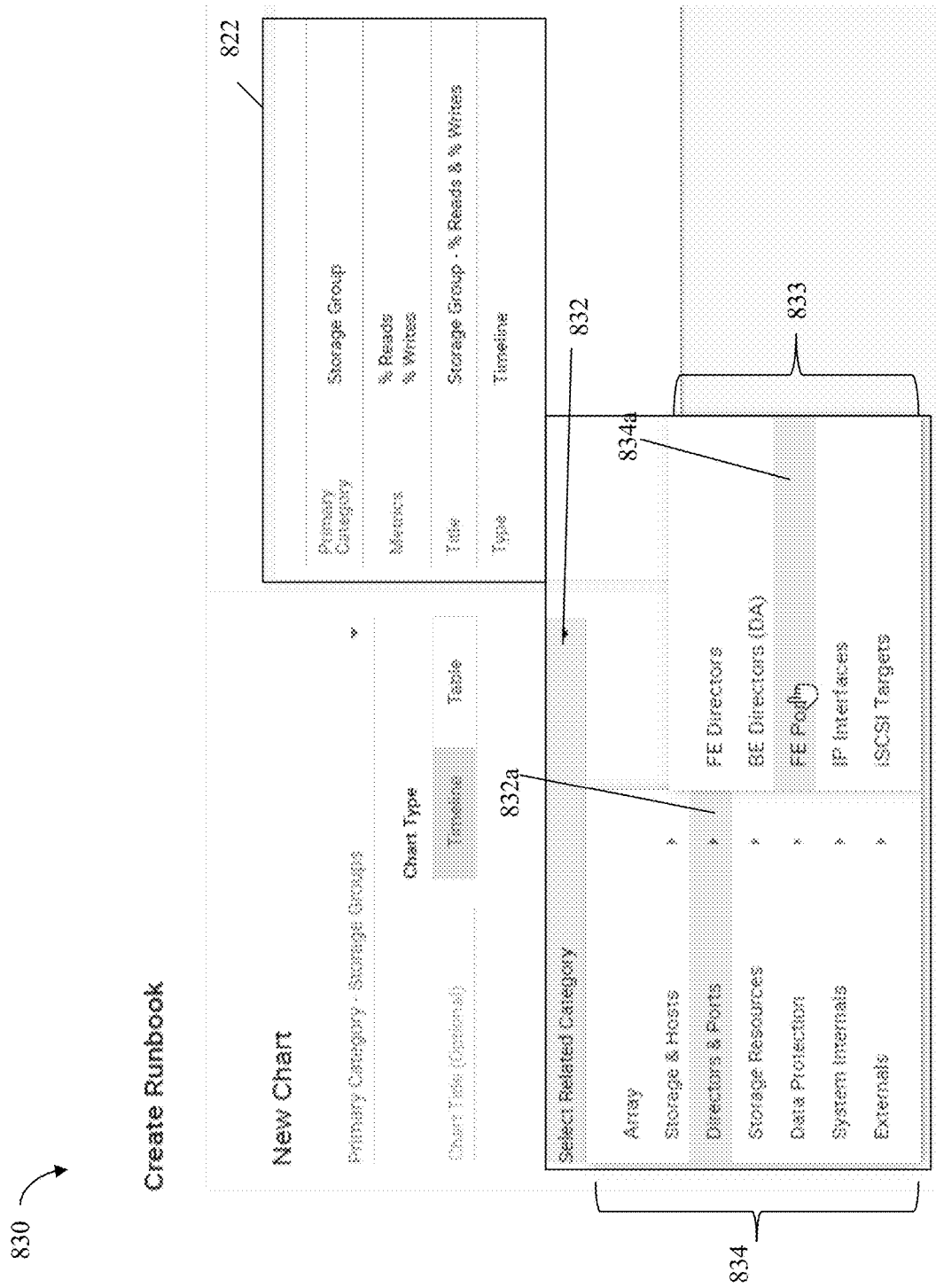
Figure 9E:
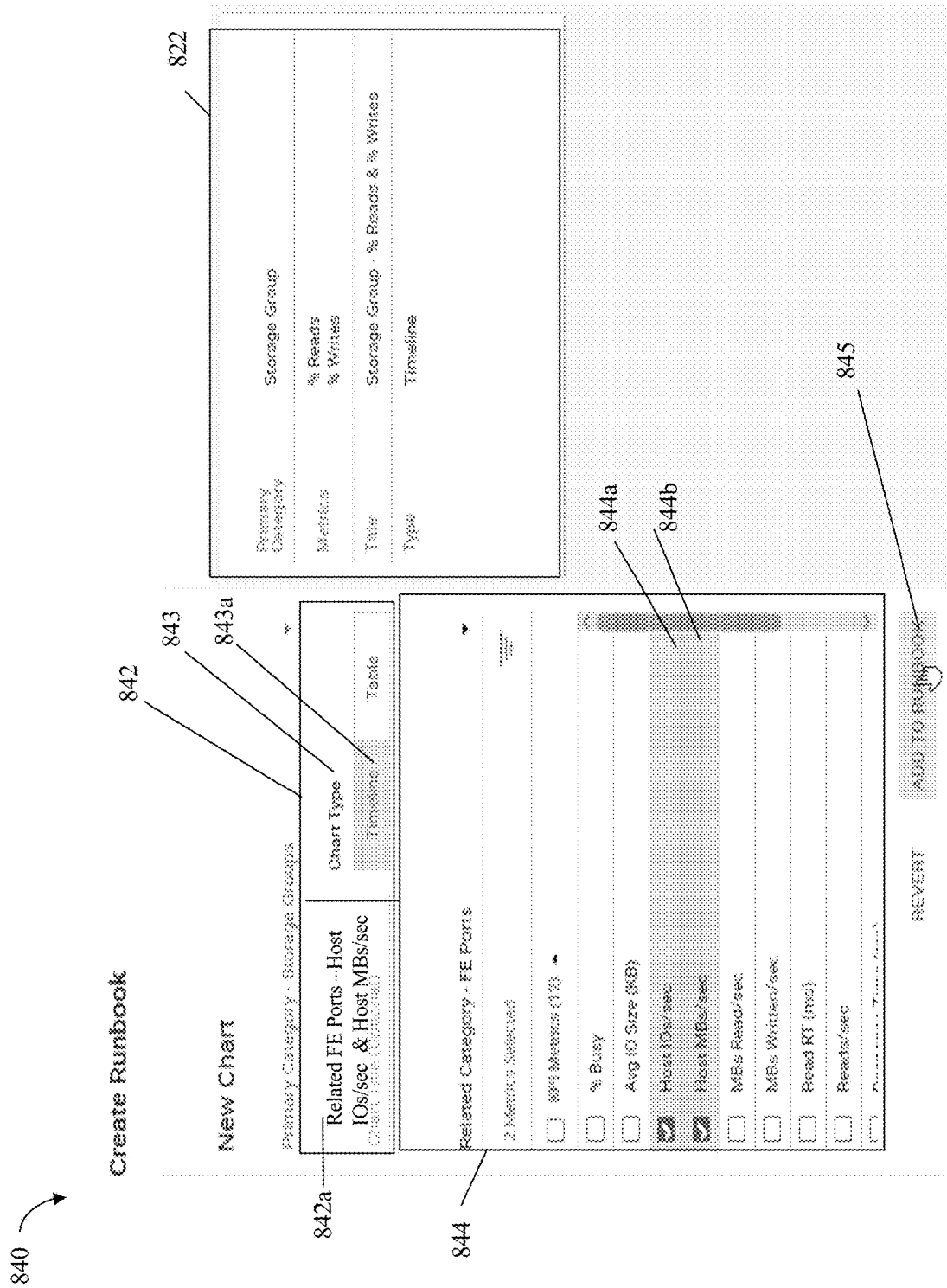

Subsequent to entering the information in connection with FIG. 9D, the user may be presented with the screenshot as illustrated in FIG. 9E. In the example 840 of FIG. 9E, the user may make selections using the GUI for the chart definition for the related object category FE ports. In connection with the area 842, the user may enter a chart title in 842a and may select a chart type 843. In this example, the chart type may be a table or a timeline graph. In the example 840, the user selects 843a denoting the timeline graph chart type.

Additionally, the user selects one or more relevant metrics from the menu 844 for the related object category of FE ports. The menu 844 may include: % busy (denoting the percentage of time a particular FE port is busy or not idle and thereby servicing incoming I/Os), avg 10 size (denoting the average I/O size in kilobytes), host IOs/second (denoting rate per second of incoming host I/Os received by a particular FE port), host MB s/second (denoting data transfer rate of host I/Os for a particular FE port), MBs read/second (denoting the amount of data read per second for a particular FE port), MBs written/second (denoting the amount of data written per second for a particular FE port), read RT, and reads/second.

In this example, the user may select two metrics—host IOs/second 844a and host MBs/second 844b. After selecting the metrics 844a and 844b, the user may select 845 to add the chart for the related object category FE ports to the runbook. In response to selecting 845, the user may be presented with the screenshot as illustrated in the example 850 of FIG. 9F.

Figure 9F:
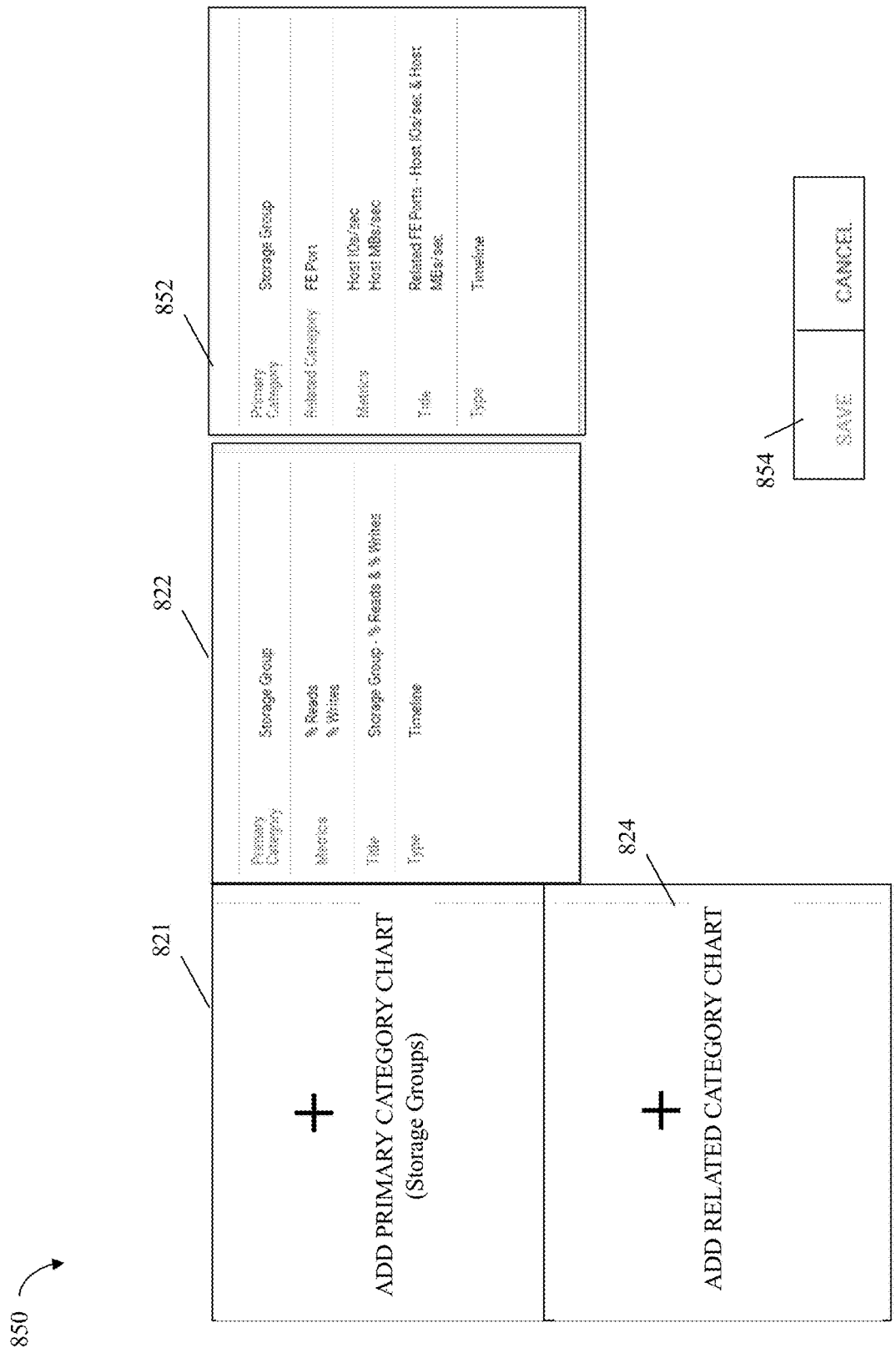

The screenshot of the example 850 of FIG. 9F is generally an updated view of the prior screenshot 820 of FIG. 9C. The example 850 has been updated to now further include the information in the area 852 for the second chart definition created for the related FE category as described in connection with FIGS. 9D and 9E. Thus, element 852 includes the second chart definition.

At this point, the user may select to define or add another chart definition for the primary object category by selecting 821, may select to define or add another chart definition for a related object category by selecting 824, or may persistently save the current runbook definition by selecting 854. In this example, the user may select 854 to save the current runbook definition that includes a single primary object category chart for SG and includes a single related object category chart for FE ports. Additionally, although not explicitly illustrated, the user may be prompted to provide a name for the runbook definition. The name may be used to uniquely identify the runbook definition from other runbook definitions that may be stored in the database. For reference purposes, assume the runbook definition created and defined using the workflow of FIG. 9A-9F has the name "SG Runbook".

At this point, the runbook definition, SG Runbook, created using the workflow of FIGS. 9A-9F may also be the currently loaded runbook definition. As a variation, an embodiment may allow the user to load the desired runbook definition, SG Runbook, from a list of runbook definitions currently stored in the database.

Figure 9G:
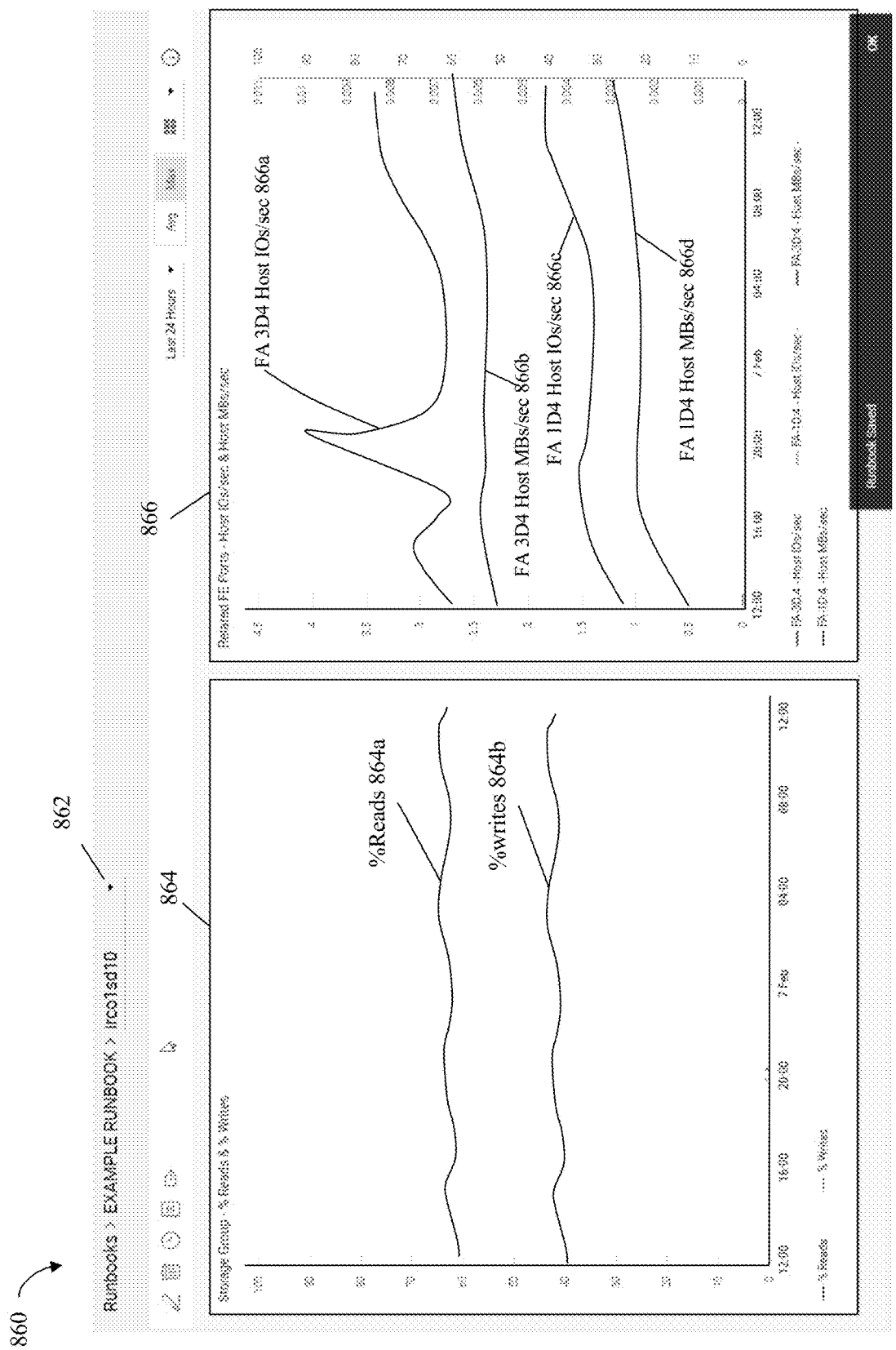

In any case, what will now be described is processing performed after SG Runbook is loaded. A user may select an instance of the primary object category, SG, to which the SG Runbook definition is applied or activated. With reference to FIG. 9G, the user may select a particular SG from a dropdown list. In this example, the user selects the SG instance irco1sd10 as denoted by 862. In response to selecting the SG instance with 862, the GUI display may be updated to include the graphs or charts 864 and 866.

Upon choosing the SG instance irco1sd10 as denoted by 862, all primary category charts of the loaded runbook definition are dynamically updated in the GUI to show the data for this selected instance. Additionally, upon selecting the instance SG1, all related category object instances are analyzed and the GUI may be dynamically updated to show the data for the particular related object categories of the loaded runbook definition.

The graph 864 may denote the chart of the dashboard displayed in the GUI for the chart definition 822; and the graph 866 may denote the chart of the dashboard displayed in the GUI for the chart definition 852.

The graph 864 is a primary object category chart that is updated to show the metrics % reads and % writes for the selected SG. The graph 864 has time displayed on the X axis and values for the metrics % reads and % writes on the Y axis for select SG. The timeline 864a denotes the % reads for the selected SG (e.g., percentage of I/Os directed to the SG that are reads); and the timeline 864d denotes the % writes for the selected SG (e.g., percentage of I/Os directed to the SG that are writes).

The graph 866 is a related object category chart that is updated to show the metrics Host IOs/sec and host MBs/sec for the particular FA ports or FE director ports used in connection with servicing I/Os directed to LUNs of the selected SG instance. The graph 866 has time displayed on the X axis and quantities for the 2 metrics on the 2 Y axes. In this example, the data storage system configuration may expose LUNs of the selected SG through 2 FA ports: FA3 D4 and FA1 D4. The line 866a denotes the graphical timeline of host IOs/second for FA3 D4 with respect to host I/Os directed to the selected SG; the line 866b denotes the graphical timeline of host MBs/second for FA3 D4 with respect to host I/Os directed to the selected SG; the timeline 866c denotes the graphical timeline of host IOs/second for FA1 D4 with respect to host I/Os directed to the selected SG; and the timeline 866d denotes the graphical timeline of host MBs/second for FA1 D4 with respect to host I/Os directed to the selected SG.

Based on the foregoing, the runbook definition (SG Runbook) of FIG. 9F specifies the selected primary and related object categories about which desired metrics of the charts 822 and 852 are displayed. Upon selection of a particular SG primary object category instance irco1sd10 for the runbook definition of FIG. 9F, the dashboard in the GUI is updated to display the charts of FIG. 9G. Thus, the runbook definition is applied to a particular primary and related object category instances.

Consistent with discussion herein, the related object categories that are relevant may vary with the particular primary object category. What will now be described in connection with FIGS. 10A and 10B are related object categories that may be associated with the SG primary object category in at least one embodiment in accordance with the techniques herein.

Figure 10A:
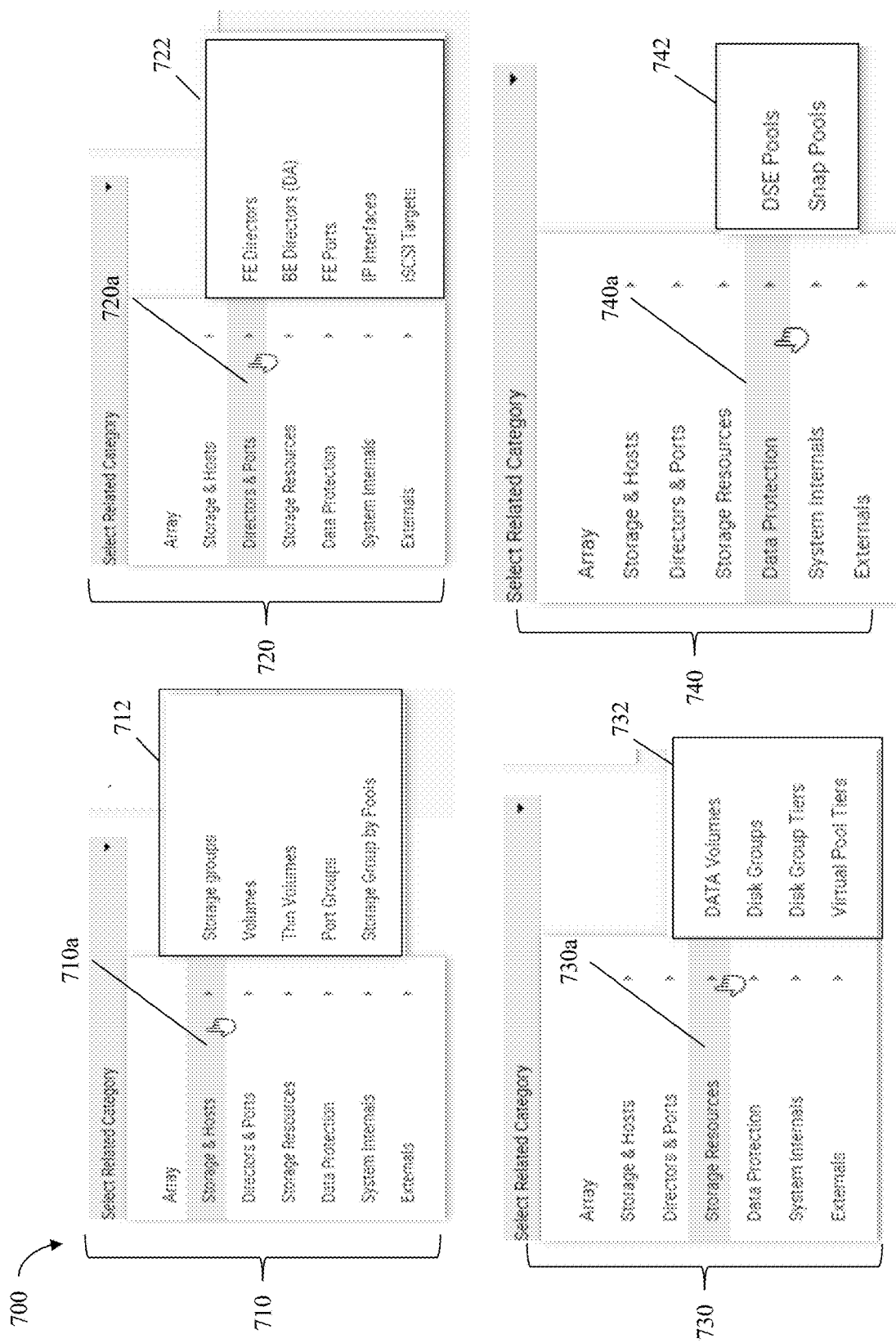
FIGS. 10A and 10B illustrate related object categories for the primary SG category in an embodiment in accordance with the techniques herein.
Figure 10B:
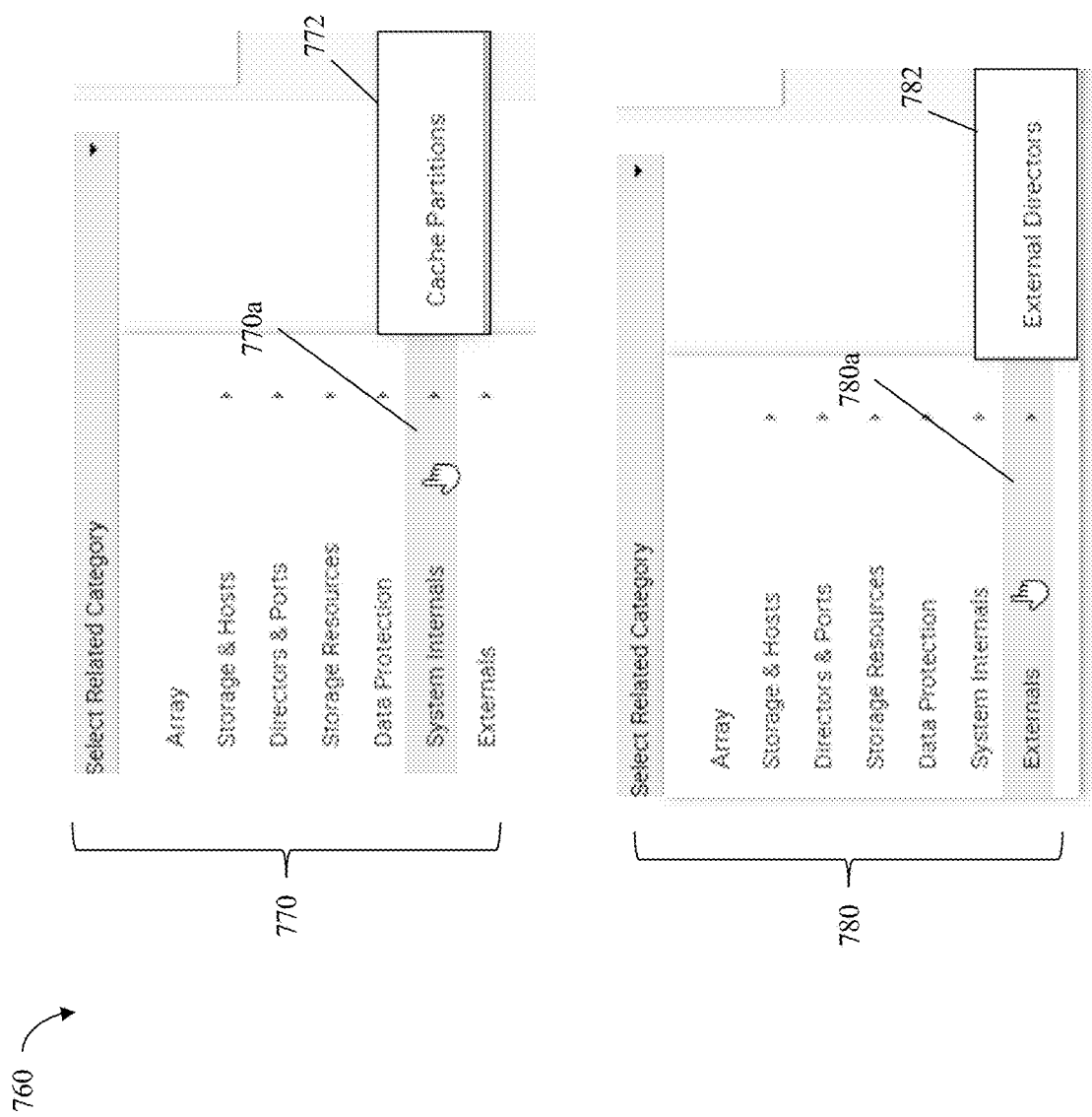

Referring to FIG. 10A, element 710 displays a first level list or menu of related object categories including array, storage & hosts, directors & ports, storage resources, data protection, system internals and externals as described above. Items on this first level list may denote general groups of related object categories. In other words, in at least one embodiment, the entire set of related object categories for the SG primary category may be partitioned into broader groups denoted by the first level list. In response to selecting the group storage &hosts 710a, the list 712 of related categories may be displayed. The list 712 may include storage groups, volumes or LUNs (e.g., all LUNs including both thin LUNs and thick or regular LUNs), thin volumes or LUNs, port groups, and storage group by pools.

Element 720 displays the first level list or menu of related object categories including array, storage & hosts, directors & ports, storage resources, data protection, system internals and externals as described above. Items on this first level list may denote general groups of related object categories as described in connection with element 710. In response to selecting directors & ports 720a, the list 722 of related categories may be displayed. The list 722 may include FE directors, BE directors (e.g., DAs), FE ports, IP interfaces and iSCSI targets.

Element 730 displays the first level list or menu of related object categories including array, storage & hosts, directors & ports, storage resources, data protection, system internals and externals as described above. Items on this first level list may denote general groups of related object categories as described in connection with element 710. In response to selecting directors storage resources 730a, the list 732 of related categories may be displayed. The list 732 may include data volumes, disk groups, disk group tiers, and virtual pool tiers.

Generally, data volumes may refers to a type of logical volume from which storage may be provisioned for use in connection with thin LUNs in at least one embodiment. Thus, a data volume may be a logical volume provisioned from physical storage such as of a storage pool or RAID group. Thin LUNs may be included in another logical layer on the data storage system where storage from the thin LUNs may be provisioned from data volumes.

A disk group may be a logical grouping of PDs of the same type formed into a RAID group using a specific RAID level. Disk group tiers may denote the physical storage tiers of PDs, for example, such as 15K RPM PDs, flash-based PDs, and the like. A virtual pool tier has a PD technology type and a protection type.

Element 740 displays the first level list or menu of related object categories including array, storage & hosts, directors & ports, storage resources, data protection, system internals and externals as described above. Items on this first level list may denote general groups of related object categories as described in connection with element 710. In response to selecting data protection 740a, the list 742 of related categories may be displayed. The list 742 may include DSE pools and Snap pools. In at least one embodiment, DSE pools may be pools of logical storage devices used in connection with performing remote replication, such as an RDF implementation. In at least one embodiment, snap pools may be pools of logical storage devices used in connection with snapshots.

Referring to FIG. 10B, element 770 displays the first level list or menu of related object categories including array, storage & hosts, directors & ports, storage resources, data protection, system internals and externals as described above. Items on this first level list may denote general groups of related object categories as described in connection with element 710. In response to selecting system internals 770a, the list 772 of related categories may be displayed. The list 772 may include cache partitions denoting defined partitions of the cache used for an SG instance.

Element 780 displays the first level list or menu of related object categories including array, storage & hosts, directors & ports, storage resources, data protection, system internals and externals as described above. Items on this first level list may denote general groups of related object categories as described in connection with element 710. In response to selecting externals 780a, the list 782 of related categories may be displayed. The list 782 may include external directors.

The related object categories illustrated in the FIGS. 10A and 10B are an example of related object categories that may be used in an embodiment as relevant to the primary object category of SG. More generally, any suitable related object categories may be specified as relevant to the primary object category of SG and any other primary object category.

In at least one embodiment in accordance with the techniques herein, default runbook definitions may be included with the data storage system management application. Examples of default runbook definitions are illustrated in connection with FIGS. 11-13 in following paragraphs.

Figure 11:
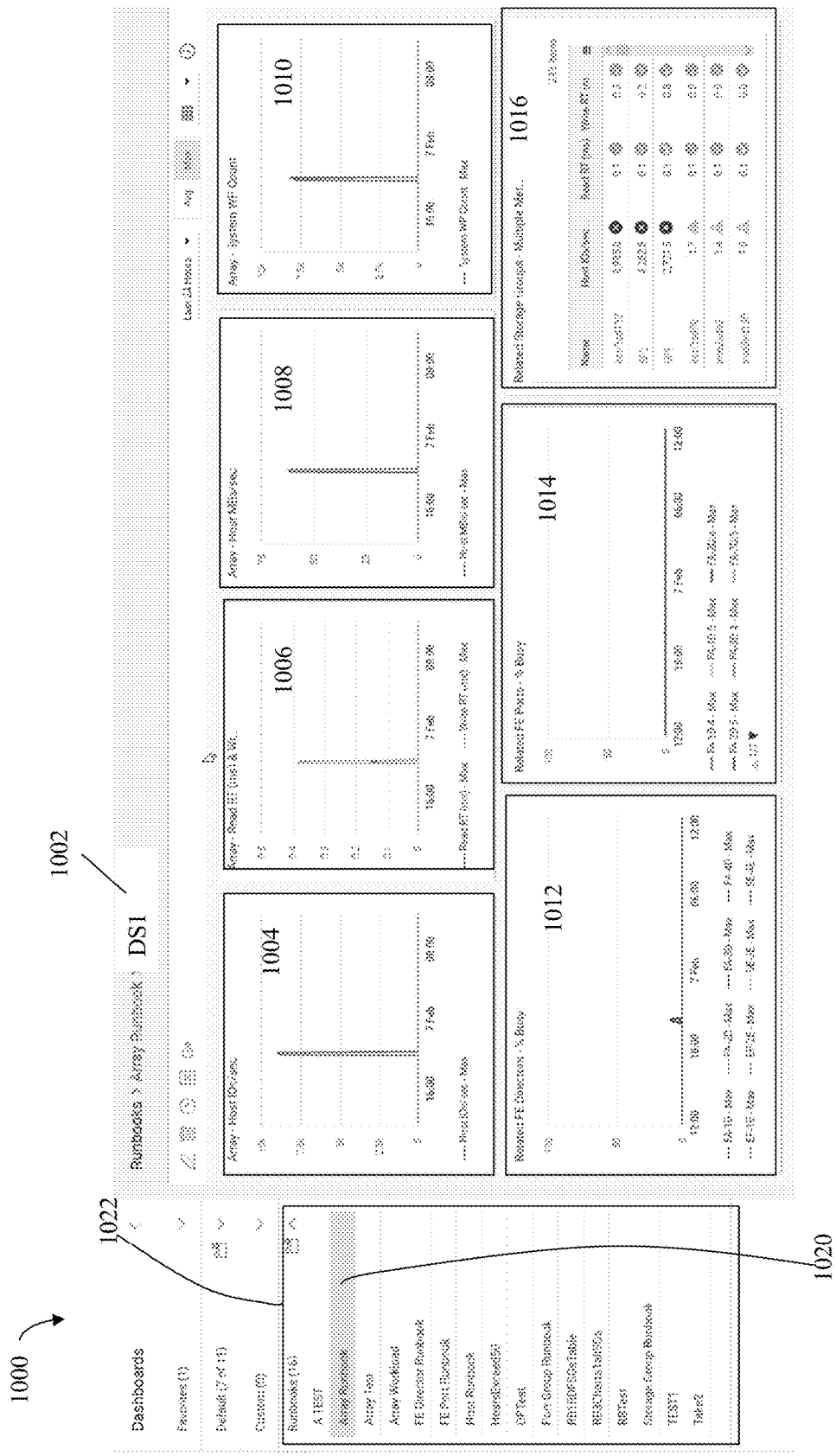

Referring to FIG. 11, shown is an example 1000 of a screenshot of charts that may be displayed in a GUI in connection with a first default runbook definition in an embodiment in accordance with the techniques herein. The example 1000 illustrates activation or application of the array runbook 1020 in connection with the array or data storage system instance DS1. The element 1002 denotes the particular runbook name, "Array Runbook" selected from the list 1022 of runbook definitions currently stored in the database.

In the example 1000, the charts 1004, 1006, 1008 and 1010 are graphs of different metrics for the array primary object category instance, DS1. The runbook definition for Array Runbook may include 4 corresponding chart definitions for 1004, 1006, 1008 and 1010 for the primary object category array. In the example 1000, the charts 1012 and 1014 are graphs for related object categories and the chart 1016 is a table for a related object category. In particular, the chart 1012 is a graph for the metric % busy for each FE director of the array instance DS1; the chart 1014 is a graph for the metric % busy for each FE director port of the array instance DS1; and the chart 1016 is a table showing the metrics Host IOs/second, read RT and write RT for each SG in the array instance DS1. In connection with the example 1000, the current DS configuration database may include configuration information for the array DS1 which identifies the particular components, such as FE directors, FE ports and SGs currently in DS1.

The runbook definition Array Runbook may be included in the data storage system management application such as, for example, by the vendor or provider of the application. This as well as other default runbook definitions may be shipped with the management application for use by an administrator or other user of the application. Such default runbooks may be further modified and stored as new or replacement runbook definitions in the database.

Figure 12:
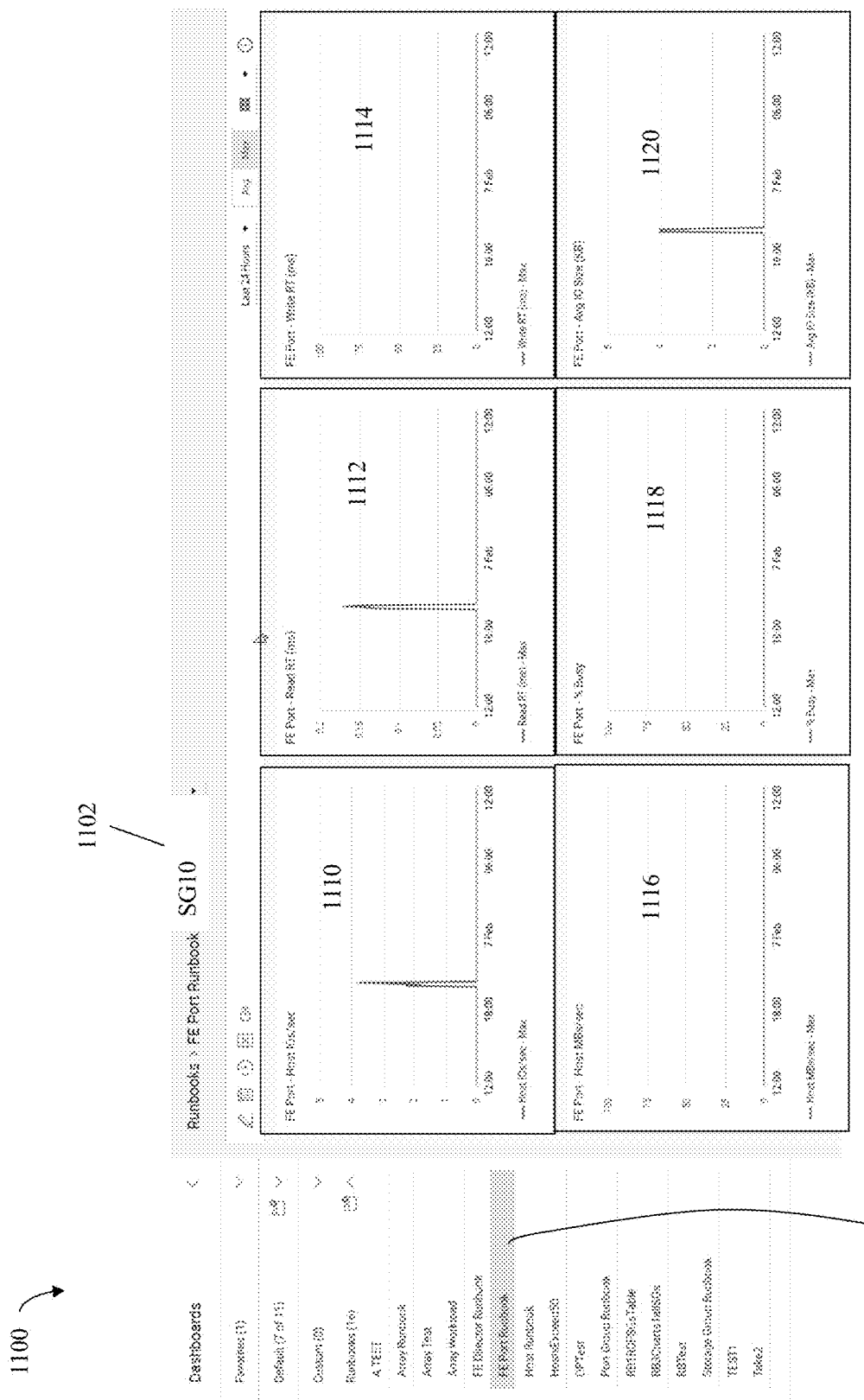

Referring to FIG. 12, shown is an example 1100 of a screenshot of charts that may be displayed in a GUI in connection with a second default runbook definition in an embodiment in accordance with the techniques herein. The example 1100 illustrates activation or application of the FE port runbook in connection with the FE port instance FA 1D 4 1102. The element 1120 denotes the particular runbook name, "FE port runbook" selected from the list of runbook definitions currently stored in the database.

In the example 1100, the charts 1110, 1112, 1114, 1116, 1118 and 1120 are graphs of different metrics for the FE port instance FA 1D 4. Each of the foregoing graphs illustrates a different metric for the FE port instance FA 1D 4. The runbook definition for FE port runbook may include 6 corresponding chart definitions for 1110, 1112, 1114, 1116, 1118 and 1120 for the primary object category FE port.

Thus, the example 1100 illustrates use of a different primary category, FE port.

Figure 13:
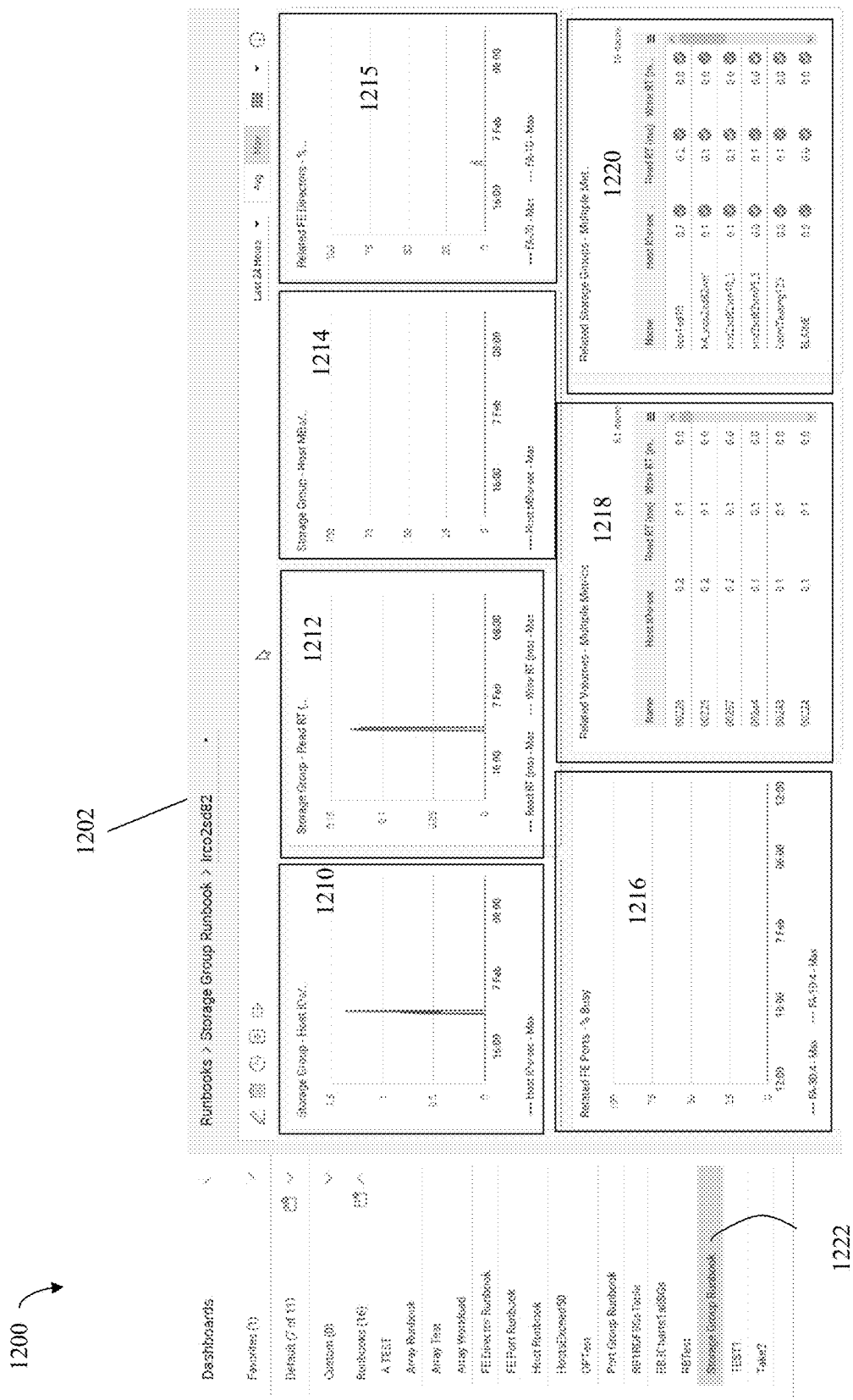

Referring to FIG. 13, shown is an example 1200 of a screenshot of charts that may be displayed in a GUI in connection with a second default runbook definition in an embodiment in accordance with the techniques herein. The example 1200 illustrates activation or application of the storage group runbook 1222 in connection with the SG instance SG 10 1202. The element 1222 denotes the particular runbook name, "storage group runbook" selected from the list of runbook definitions currently stored in the database.

In the example 1200, the charts 1210, 1212 and 1214 are graphs of different metrics for the SG primary object category instance, SG10. The runbook definition for storage group runbook may include 3 corresponding chart definitions for 1210, 1212 and 1214 for the primary object category SG. In the example 1200, the charts 1215 and 1216 are graphs for related object categories and the charts 1218 and 1220 are tables for related object categories. In particular, the chart 1214 is a graph for the metric % busy for each FE director of the SG instance SG10; the chart 1216 is a graph for the metric % busy for each FE director port of the SG instance SG1; the chart 1218 is a table showing the metrics Host IOs/second, read RT and write RT for each volume or LUN in the SG instance SG10; and the chart 1220 is a table showing the metrics Host IOs/second, read RT and write RT for other SG instances in the same array or data storage system as SG 10.

In connection with the example 1200, the current DS configuration database may include configuration information for SG10 which identifies the particular components, such as FE directors, FE ports and LUNs or volumes in SG10. Additionally, the configuration information may also identify the other SG instances included in the first columns of the table 1220.

As discussed herein, the runbook definitions may be stored persistently in a database, such as denoted by the element 108 in the FIGS. 3A-3C and the element 630 in the FIG. 630 of the FIG. 8. Generally, each runbook definition may be stored in any suitable form and format. For example, in at least one embodiment, the runbook definitions may be encoded in XML (extensible markup language).

A single runbook as described in the embodiments herein may include a single primary object category and one or more related object categories. The related object categories may be characterized as secondary related categories relative to the single primary object category. As a variation, an embodiment may generally allow for having more than one primary object category and its related object categories and charts in the same runbook definition.

In at least one embodiment, runbook definitions may be linked together. For example, consider the default array runbook definition as illustrated in FIG. 11. The array runbook definition may include a single primary object category of array and related object categories and charts as described in connection with FIG. 11. Now, with reference back to FIG. 11, assume a user selects a particular SG from the table 1016. In response to selecting the particular SG instance in the table 1016, processing may be performed to link to a second runbook definition that further displays information for the selected SG instance. For example, the second runbook definition may be the default storage group runbook definition described in connection with FIG. 13. The array runbook definition may include suitable syntax for the runtime linkage where, in response to selecting an SG instance in the first column of the table 1220, the storage group runbook definition is loaded and activated or applied with respect to the selected SG instance. Thus, the storage group runbook definition has a primary object category of SG matching the related object category of the selected SG instance in the array runbook definition.

The foregoing linkage between multiple runbooks may be used, for example, in connection with drilling down when troubleshooting by a user such as to identify performance bottlenecks, such as LUNs or volumes on the data storage system having a high RT or high I/O workload, identifying which FE directors or FE ports may be overloaded, and the like. For example, the definitions for the array runbook and the storage group runbook may define charts using relevant key metrics that are important for use with troubleshooting such as identifying performance bottlenecks as noted above.

Generally, runbook definitions may be used to provide different views regarding performance and health of the system and its components. In this manner, one use of the runbook definitions may be to facilitate viewing selective metrics about different system components to assist in drilling down and identifying the problem source such as a particular logical or physical storage entity causing a performance bottleneck.

An embodiment may use any suitable technique to determine the layout of the UI display of the charts for the objects of a runbook definition and object instances.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of specifying information displayed in a graphical user interface comprising:
receiving a runbook definition, wherein the runbook definition is a template including a primary object category, a first object category that is related to the primary object category, a first chart definition of first one or more metrics about the primary object category, and a second chart definition of second one or more metrics about the first object category;
loading the runbook definition;
applying the runbook definition to a first primary object that is an instance of the primary object category, wherein the first primary object has a first related object and the first related object is an instance of the first object category;
in response to said applying, updating the graphical user interface to display a first chart having the first chart definition of the first one or more metrics for the first primary object and updating the graphical user interface to display a second chart having the second chart definition of the second one or more metrics for the first related object;
selecting a second primary object that is an instance of the primary object category;

applying the runbook definition to the second primary object that is an instance of the primary object category, wherein the second primary object has a second related object and wherein the second related object is an instance of the first object category; and in response to said applying the runbook definition to the second primary object, updating the graphical user interface to display a third chart having the first chart definition of the first one or more metrics for the second primary object and updating the graphical user interface to display a fourth chart having the second chart definition of the second one or more metrics for the second related object.

2. The method of claim 1, wherein the runbook definition is persistently stored in a database.

3. The method of claim 1, further comprising performing first processing that creates the runbook definition, wherein the first processing includes:

selecting the primary object category from a plurality of predefined primary object categories;

creating the first chart definition of the first one or more metrics about the primary object category;

displaying a plurality of predefined related object categories that are related to the selected primary object category, wherein the plurality of predefined related object categories includes the first object category;

responsive to displaying the plurality of predefined related object categories, selecting the first object category from the plurality of predefined related object categories; and creating the second chart definition of the second one or more metrics about the first object category.

4. The method of claim 1, further comprising performing first processing that generates an updated version of the runbook definition.

5. The method of claim 4, wherein the first processing includes updating the runbook definition to include a third chart definition of third one or more metrics about a specified object category that is one of the primary object category or the first object category, and wherein the updated version of the runbook definition includes the third chart definition.

6. The method of claim 4, further comprising:

storing the updated version of the runbook definition as a new runbook definition.

7. A method of specifying information displayed in a graphical user interface comprising:

receiving a runbook definition, wherein the runbook definition is a template including a primary object category, a first object category that is related to the primary object category, a first chart definition of first one or more metrics about the primary object category, and a second chart definition of second one or more metrics about the first object category;

loading the runbook definition;

applying the runbook definition to a first primary object that is an instance of the primary object category, wherein the first primary object has a first related object and the first related object is an instance of the first object category;

in response to said applying the runbook definition to the first primary object, updating the graphical user interface to display a first chart having the first chart definition of the first one or more metrics for the first primary object and updating the graphical user interface to display a second chart having the second chart definition of the second one or more metrics for the first related object;

performing first processing that generates an updated version of the runbook definition;

storing the updated version of the runbook definition as a new runbook definition;

loading the new runbook definition;

applying the new runbook definition to a second primary object that is an instance of the primary object category and wherein the second primary object has a second related object that is an instance of the first object category; and in response to said applying the new runbook definition, performing second processing including:

updating the graphical user interface to display a third chart having the first chart definition of the first one or more metrics for the second primary object;

updating the graphical user interface to display a fourth chart having the second chart definition of the second one or more metrics for the second related object; and updating the graphical user interface to display a fifth chart having the third chart definition of the third one or more metrics about one of the second primary object or the second related object determined in accordance with the specified object category.

8. The method of claim 1, wherein the primary object category and the first object category that is related to the primary object category define a first relationship between objects, and wherein the first relationship between objects is included in a plurality of predefined relationships between a plurality of primary object categories and a plurality of other object categories related to the plurality of primary object categories.

9. The method of claim 8, wherein the plurality of primary object categories and the plurality of other object categories are storage object categories.

10. The method of claim 9, wherein each of the storage object categories denotes a physical storage object category in a data storage system or a logical storage object category in the data storage system.

11. The method of claim 10, wherein the storage object categories include any one or more of: a data storage array, a storage group, a logical device, a physical storage device, a front end director, a front end director port, a back end director, and a back end director port.

12. The method of claim 11, wherein the primary object category is the storage group and the first primary object denotes a first storage group defined in a current configuration of the data storage system, and wherein the first object category is the logical device and the first related object denotes a first logical device defined in the current configuration of the data storage system.

13. The method of claim 1, wherein the graphical user interface is included in a data storage management application.

14. The method of claim 1, wherein each of the first chart definition and the second chart definition identifies a chart type.

15. The method of claim 14, wherein the chart type is included in a plurality of predefined chart types including a graph and a table.

16. The method of claim 1, wherein runbook definition is a first runbook definition that is linked to a second runbook definition.

17. A method of specifying information displayed in a graphical user interface comprising:
  receiving a runbook definition, wherein the runbook definition is a template including a primary object category, a first object category that is related to the primary object category, a first chart definition of first one or more metrics about the primary object category, and a second chart definition of second one or more metrics about the first object category;
  loading the runbook definition;
  applying the runbook definition to a first primary object that is an instance of the primary object category, wherein the first primary object has a first related object and the first related object is an instance of the first object category;
  in response to said applying, updating the graphical user interface to display a first chart having the first chart definition of the first one or more metrics for the first primary object and updating the graphical user interface to display a second chart having the second chart definition of the second one or more metrics for the first related object, wherein runbook definition is a first runbook definition that is linked to a second runbook definition;
  selecting the first related object displayed in the graphical user interface; and
  responsive to selecting the first related object, performing processing to link to the second runbook definition, wherein said processing includes:
    loading the second runbook definition;
    applying the second runbook definition to the first related object as a second primary object used in connection with the second runbook definition; and
    updating the graphical user interface to include one or more additional charts each having a chart definition included in the second runbook definition.

18. A system comprising:
  one or more processors; and
  one or more memories comprising code stored thereon that, when executed, performs a method of specifying information displayed in a graphical user interface comprising:
    receiving a runbook definition, wherein the runbook definition is a template including a primary object category, a first object category that is related to the primary object category, a first chart definition of first one or more metrics about the primary object category, and a second chart definition of second one or more metrics about the first object category;
    loading the runbook definition;
    applying the runbook definition to a first primary object that is an instance of the primary object category, wherein the first primary object has a first related object and the first related object is an instance of the first object category;
    in response to said applying, updating the graphical user interface to display a first chart having the first chart definition of the first one or more metrics for the first primary object and updating the graphical user interface to display a second chart having the second chart definition of the second one or more metrics for the first related object;
    selecting a second primary object that is an instance of the primary object category;
    applying the runbook definition to the second primary object that is an instance of the primary object category, wherein the second primary object has a second related object and wherein the second related object is an instance of the first object category; and
    in response to said applying the runbook definition to the second primary object, updating the graphical user interface to display a third chart having the first chart definition of the first one or more metrics for the second primary object and updating the graphical user interface to display a fourth chart having the second chart definition of the second one or more metrics for the second related object.

19. A non-transitory computer readable medium comprising code stored thereon that, when executed, performs method of specifying information displayed in a graphical user interface comprising:
  receiving a runbook definition, wherein the runbook definition is a template including a primary object category, a first object category that is related to the primary object category, a first chart definition of first one or more metrics about the primary object category, and a second chart definition of second one or more metrics about the first object category;
  loading the runbook definition;
  applying the runbook definition to a first primary object that is an instance of the primary object category, wherein the first primary object has a first related object and the first related object is an instance of the first object category;
  in response to said applying, updating the graphical user interface to display a first chart having the first chart definition of the first one or more metrics for the first primary object and updating the graphical user interface to display a second chart having the second chart definition of the second one or more metrics for the first related object;
  selecting a second primary object that is an instance of the primary object category;
  applying the runbook definition to the second primary object that is an instance of the primary object category, wherein the second primary object has a second related object and wherein the second related object is an instance of the first object category; and
  in response to said applying the runbook definition to the second primary object, updating the graphical user interface to display a third chart having the first chart definition of the first one or more metrics for the second primary object and updating the graphical user interface to display a fourth chart having the second chart definition of the second one or more metrics for the second related object.

20. A non-transitory computer readable memory comprising code stored thereon that, when executed, performs a method of specifying information displayed in a graphical user interface comprising:
  receiving a runbook definition, wherein the runbook definition is a template including a primary object category, a first object category that is related to the primary object category, a first chart definition of first one or more metrics about the primary object category, and a second chart definition of second one or more metrics about the first object category;
  loading the runbook definition;
  applying the runbook definition to a first primary object that is an instance of the primary object category, wherein the first primary object has a first related object and the first related object is an instance of the first object category;

in response to said applying the runbook definition to the first primary object, updating the graphical user interface to display a first chart having the first chart definition of the first one or more metrics for the first primary object and updating the graphical user interface to display a second chart having the second chart definition of the second one or more metrics for the first related object;
performing first processing that generates an updated version of the runbook definition;
storing the updated version of the runbook definition as a new runbook definition;
loading the new runbook definition;
applying the new runbook definition to a second primary object that is an instance of the primary object category and wherein the second primary object has a second related object that is an instance of the first object category; and
in response to said applying the new runbook definition, performing second processing including:
updating the graphical user interface to display a third chart having the first chart definition of the first one or more metrics for the second primary object;
updating the graphical user interface to display a fourth chart having the second chart definition of the second one or more metrics for the second related object; and
updating the graphical user interface to display a fifth chart having the third chart definition of the third one or more metrics about one of the second primary object or the second related object determined in accordance with the specified object category.

21. A system comprising:
one or more processors; and
one or more memories comprising code stored thereon that, when executed, perform a method of specifying information displayed in a graphical user interface comprising:
receiving a runbook definition, wherein the runbook definition is a template including a primary object category, a first object category that is related to the primary object category, a first chart definition of first one or more metrics about the primary object category, and a second chart definition of second one or more metrics about the first object category;
loading the runbook definition;
applying the runbook definition to a first primary object that is an instance of the primary object category, wherein the first primary object has a first related object and the first related object is an instance of the first object category;
in response to said applying the runbook definition to the first primary object, updating the graphical user interface to display a first chart having the first chart definition of the first one or more metrics for the first primary object and updating the graphical user interface to display a second chart having the second chart definition of the second one or more metrics for the first related object;
performing first processing that generates an updated version of the runbook definition;
storing the updated version of the runbook definition as a new runbook definition;
loading the new runbook definition;
applying the new runbook definition to a second primary object that is an instance of the primary object category and wherein the second primary object has a second related object that is an instance of the first object category; and
in response to said applying the new runbook definition, performing second processing including:
updating the graphical user interface to display a third chart having the first chart definition of the first one or more metrics for the second primary object;
updating the graphical user interface to display a fourth chart having the second chart definition of the second one or more metrics for the second related object; and
updating the graphical user interface to display a fifth chart having the third chart definition of the third one or more metrics about one of the second primary object or the second related object determined in accordance with the specified object category.

22. A non-transitory computer readable medium comprising code stored thereon that, when executed, performs a method of specifying information displayed in a graphical user interface comprising: receiving a runbook definition, wherein the runbook definition is a template including a primary object category, a first object category that is related to the primary object category, a first chart definition of first one or more metrics about the primary object category, and a second chart definition of second one or more metrics about the first object category; loading the runbook definition; applying the runbook definition to a first primary object that is an instance of the primary object category, wherein the first primary object has a first related object and the first related object is an instance of the first object category; in response to said applying, updating the graphical user interface to display a first chart having the first chart definition of the first one or more metrics for the first primary object and updating the graphical user interface to display a second chart having the second chart definition of the second one or more metrics for the first related object, wherein runbook definition is a first runbook definition that is linked to a second runbook definition; selecting the first related object displayed in the graphical user interface; and responsive to selecting the first related object, performing processing to link to the second runbook definition, wherein said processing includes: loading the second runbook definition; applying the second runbook definition to the first related object as a second primary object used in connection with the second runbook definition; and updating the graphical user interface to include one or more additional charts each having a chart definition included in the second runbook definition.

23. A system comprising:
one or more processors; and
one or more memories comprising code stored thereon that, when executed, perform a method of specifying information displayed in a graphical user interface comprising:
receiving a runbook definition, wherein the runbook definition is a template including a primary object category, a first object category that is related to the primary object category, a first chart definition of first one or more metrics about the primary object category, and a second chart definition of second one or more metrics about the first object category;
loading the runbook definition;
applying the runbook definition to a first primary object that is an instance of the primary object category, wherein the first primary object has a first related object and the first related object is an instance of the first object category;

in response to said applying, updating the graphical user interface to display a first chart having the first chart definition of the first one or more metrics for the first primary object and updating the graphical user interface to display a second chart having the second chart definition of the second one or more metrics for the first related object, wherein runbook definition is a first runbook definition that is linked to a second runbook definition;

selecting the first related object displayed in the graphical user interface; and responsive to selecting the first related object, performing processing to link to the second runbook definition, wherein said processing includes:

loading the second runbook definition;

applying the second runbook definition to the first related object as a second primary object used in connection with the second runbook definition; and updating the graphical user interface to include one or more additional charts each having a chart definition included in the second runbook definition.

* * * * *